(12) United States Patent
Ramer et al.

(10) Patent No.: US 11,553,300 B2
(45) Date of Patent: *Jan. 10, 2023

(54) LIGHTING FOR BIOMECHATRONICALLY ENHANCED ORGANISM

(71) Applicant: ABL IP HOLDING LLC, Conyers, GA (US)

(72) Inventors: David P. Ramer, Reston, VA (US); Jack C. Rains, Jr., Sarasota, FL (US); Januk Aggarwal, Alexandria, VA (US)

(73) Assignee: ABL IP HOLDING LLC, Conyers, GA (US)

(*) Notice: Subject to any disclaimer, the term of this patent is extended or adjusted under 35 U.S.C. 154(b) by 512 days.

This patent is subject to a terminal disclaimer.

(21) Appl. No.: 16/673,308

(22) Filed: Nov. 4, 2019

(65) Prior Publication Data
US 2020/0068684 A1 Feb. 27, 2020

Related U.S. Application Data

(62) Division of application No. 14/858,371, filed on Sep. 18, 2015, now Pat. No. 10,506,685.

(51) Int. Cl.
H04W 4/02 (2018.01)
H04W 4/00 (2018.01)
H05B 47/105 (2020.01)
H02J 13/00 (2006.01)
H04W 4/80 (2018.01)

(52) U.S. Cl.
CPC ......... H04W 4/02 (2013.01); H02J 13/00017 (2020.01); H04W 4/00 (2013.01); H04W 4/80 (2018.02); H05B 47/105 (2020.01); H02J 13/00028 (2020.01); Y02B 70/30 (2013.01); Y02P 90/50 (2015.11); Y04S 20/246 (2013.01)

(58) Field of Classification Search
CPC .............................. H04W 4/80; H05B 47/105
See application file for complete search history.

(56) References Cited

U.S. PATENT DOCUMENTS

| | | | | |
|---|---|---|---|---|
| 6,009,247 A | * | 12/1999 | Canora | H04W 84/18 710/36 |
| 10,506,685 B2 | * | 12/2019 | Ramer | H02J 13/00017 |
| 2005/0038483 A1 | * | 2/2005 | MacDonald | H02N 11/002 977/948 |
| 2008/0300660 A1 | * | 12/2008 | John | H04B 5/0037 607/61 |
| 2009/0058361 A1 | * | 3/2009 | John | A61N 1/3787 307/104 |
| 2011/0241616 A1 | * | 10/2011 | Kim | H02J 50/12 320/108 |

(Continued)

Primary Examiner — Abdullah A Riyami
Assistant Examiner — Syed M Kaiser
(74) Attorney, Agent, or Firm — RatnerPrestia

(57) ABSTRACT

Examples of lighting equipment provide services to and on behalf of a biomechatronically enhanced organism and/or a biomechatronic component of the organism. Such services include charging, communications, location-related services, control, optimization, client-server functions and distributed processing functionality. The biomechatronically enhanced organism and/or biomechatronic component utilize such services provided by and/or via the lighting equipment to enable, enhance or otherwise influence operation of the organism.

9 Claims, 8 Drawing Sheets

(56) References Cited

U.S. PATENT DOCUMENTS

| | | | | |
|---|---|---|---|---|
| 2012/0007441 A1* | 1/2012 | John | ............... | A61N 1/37252 |
| | | | | 307/104 |
| 2012/0299539 A1* | 11/2012 | Jones | ................... | H02J 50/10 |
| | | | | 320/108 |
| 2013/0293877 A1 | 11/2013 | Ramer et al. | | |
| 2014/0354187 A1 | 12/2014 | Aggarwal et al. | | |
| 2015/0043425 A1 | 2/2015 | Aggarwal et al. | | |
| 2015/0280488 A1 | 10/2015 | Wyrwas et al. | | |

* cited by examiner

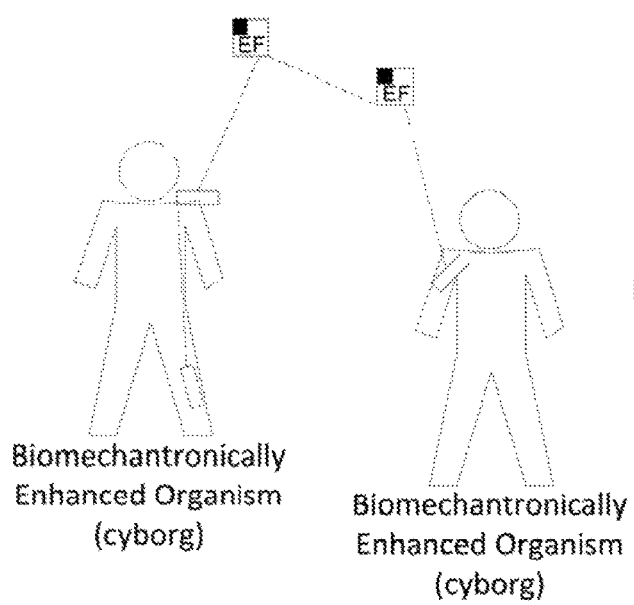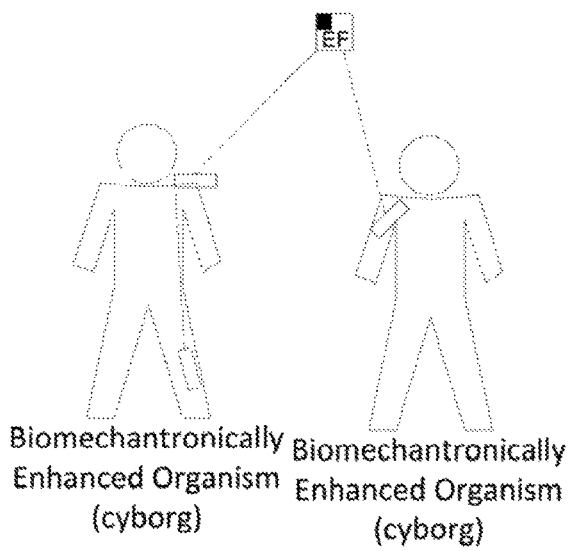

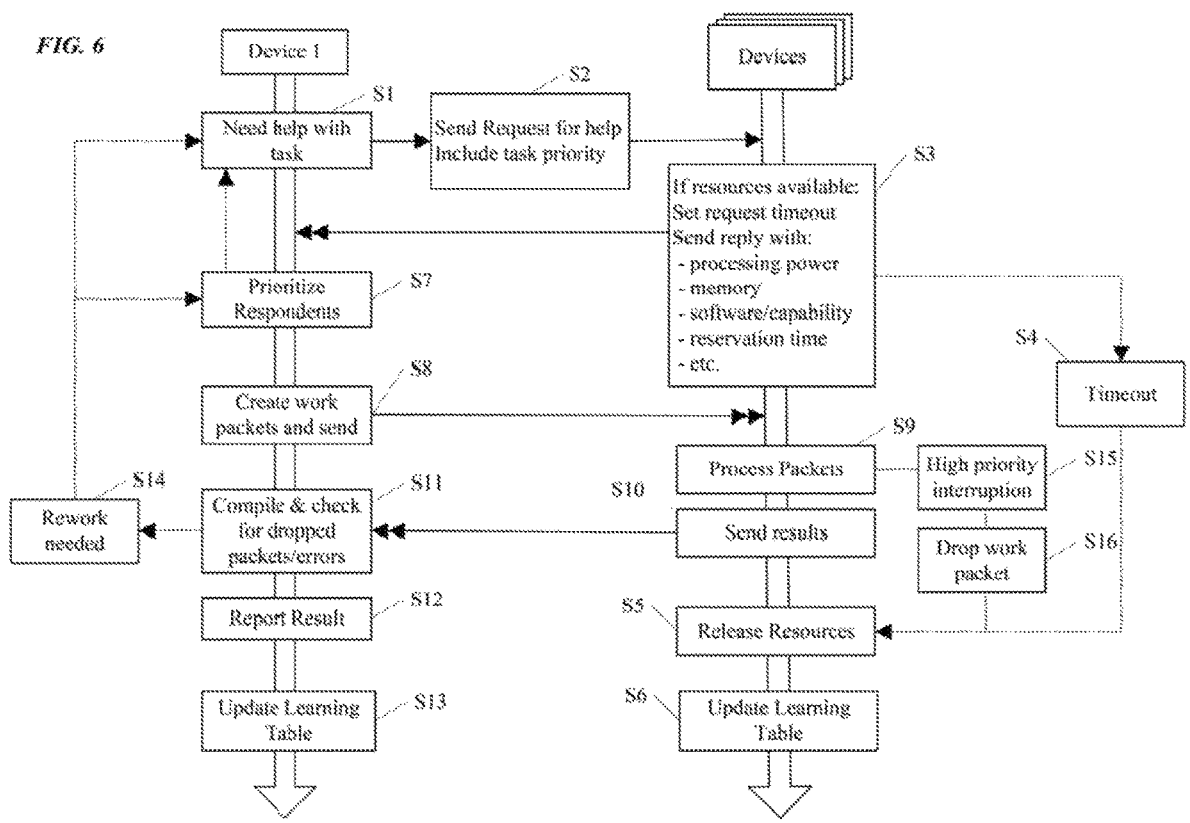

LIGHTING FOR BIOMECHATRONICALLY ENHANCED ORGANISM

CROSS-REFERENCE TO RELATED APPLICATIONS

This application is a Divisional Application of U.S. application Ser. No. 14/858,371, filed Sep. 18, 2015, now allowed; the disclosure of which is incorporated herein by reference in its entirety for all purposes.

TECHNICAL FIELD

The examples discussed below relate to lighting devices, lighting systems, system elements and components thereof which provide services to and on behalf of a biomechatronically enhanced organism (also known and referred to as a cybernetic organism or cyborg). The examples discussed below also relate to biomechatronically enhanced organisms and/or biomechatronic components which utilize services provided by the system. The services include, for example, charging, communications, location-related services, control, optimization, client-server functions and distributed processing functionality.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use. At the same time, biomechantronically enhanced organisms, or the use of one or more biomechantronic components attached to or within an organism, is increasing.

Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light, only when ambient light is at or below a threshold (e.g. as the sun goes down) and in response to occupancy sensors (e.g., to turn on light when a room is occupied and to turn the light off when the room is no longer occupied for some period). Often traditional lighting devices are controlled individually or as relatively small groups at separate locations.

With the advent of modern electronics has come advancement, including advances in the types of light sources as well as advancements in networking and control capabilities of the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the lighting devices, it becomes relatively easy to incorporate associated communications capabilities, e.g. to allow lighting devices to, communicate with system control elements and/or with each other. In this way, advanced electronics in the lighting devices as well as the associated control elements have facilitated more sophisticated lighting control algorithms as well as increased networking of lighting devices.

Similarly, advances in biomechantronic components as well as advancements in networking and control capabilities of biomechantronic components continue. For example, a biomechantronic component, and even a biomechantronically enhanced organism via the biomechantronic component, may utilize a network connection to exchange communication, including information about and/or information for the biomechantronic component or biomechantronically enhanced organism. However, the biomechantronic component may be constrained in the amount of power available to establish and maintain such network connection. In addition, due to their electrical nature, biomechantronic components require a reliable source of enduring and/or renewable energy. As such, biomechantronic components, for example, need to be able to establish and maintain a relatively low power, short range wireless network connection as well as utilize a source of radiant energy to charge a local energy store.

There also have been various other initiatives to provide communication networks and automation throughout a home or other type of building. For example, today, many buildings and/or enterprise campuses include local area data communication networks. Increasingly, some of these installations support communications for automated control and/or monitoring purposes, which may use the data network or other communication media in support of control and/or monitoring functions. For example, a building control and automation system may allow personnel of an enterprise to communicate with and control various systems, such as heating-air conditioning and ventilation (HVAC) equipment, at one or more enterprise premises. For home automation, applications are now available to allow a user to operate a mobile device (e.g. smartphone or tablet) to communicate with and control smart devices in the home, such as appliance, HVAC and audio-visual systems. To the extent that these developments in communication and automation have considered lighting, they have only included the lighting related elements as controlled outputs (e.g., to turn ON/OFF or otherwise adjust lighting device output) and in a few cases as sensed condition inputs (e.g. to receive data from light level or room occupancy type sensor devices). The focus of such communication networks or automation systems has instead centered around other perspectives, such as around control of HVAC or other major enterprise systems and/or around the relevant user/data communications aspects (e.g. mobile devices and associated applications).

Conversely, as more and more devices, such as biomechantronic components, become intelligent and may utilize data communications in support of new features and functions, the demand on data communication media within the premises skyrockets. Traditional networking, utilizing hard links such as various types of electrical wiring or optical cables, is often expensive to install and may not be practical in many premises. Even if installed within a premises, it may not be particularly easy, or even practical, to connect biomechantronic components at different locations to the existing media and/or to move such components about the premises and still readily connect to the on-premises network media.

Wireless media offer increased flexibility and/or mobility. However, as more and more of our everyday objects become connected and start using wireless communication, the available radio spectrum is quickly becoming saturated.

There is room for further improvement particularly with respect to ways to support increased deployment of biomechantronic components to enhance organisms.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3 is a diagram for a simple example of utilizing an intelligent lighting device, such as depicted in FIG. 1B or that might, be part of a system like that shown in FIG. 1C, to enable data communications exchange between biomechantronic components.

FIG. 4 is a diagram for a simple example of utilizing an intelligent lighting device, such as depicted in FIG. 1A or that might be part of a system like that shown in FIG. 1C, to enable charging of a biomechantronic component.

FIG. 6 is a flow chart of a simple example of a procedure for distributed processing, involving resource sharing, which may be implemented in a lighting system like that of FIG. 1C.

DETAILED DESCRIPTION

Figure 1A:
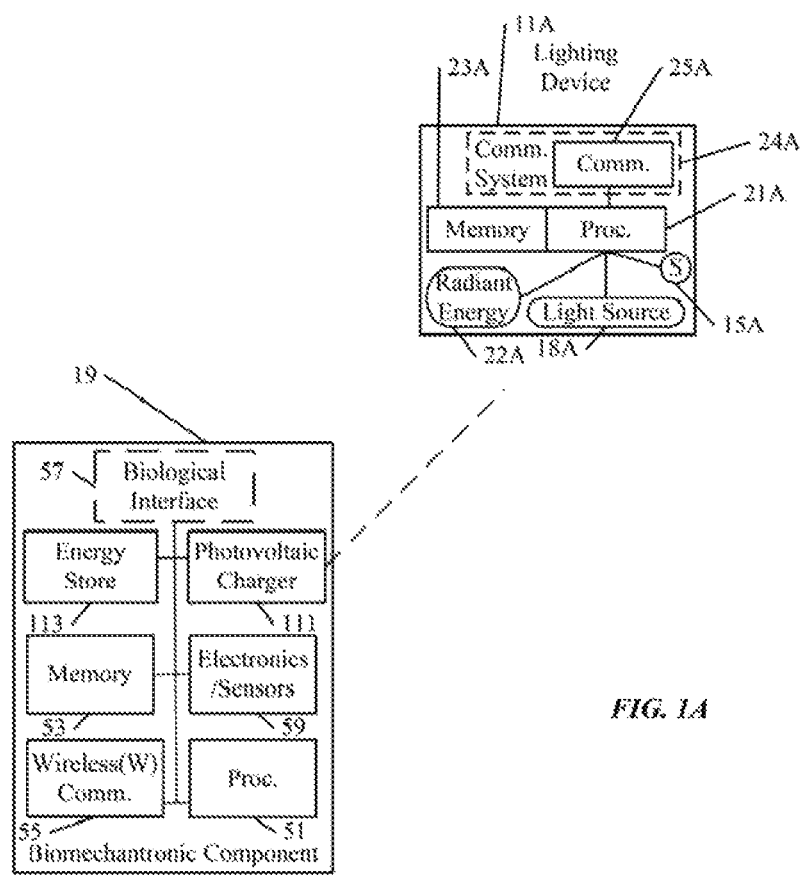
FIG. 1A is a functional block diagram of an example of a lighting device and an example of a biomechantronic component which may utilize the lighting device to charge a local energy store.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In various examples discussed below and shown in the drawings, a lighting device includes a light source and an additional source of radiant energy. Thus, such a lighting device provides, for example, radiant energy via artificial manipulation. Either or both of the light source and/or the additional radiant energy source, for example, enables a biomechantronic component to charge a local energy store via a charger, such as a photovoltaic charger. In other examples discussed below and shown in the drawings, a lighting device includes a wireless communication interface. Such wireless communication interface, for example, provides wireless data network access for a biomechantronic component within range of the lighting device.

In still other examples discussed below, a lighting device includes both one or more sources of radiant energy as well as a wireless communication interface for providing wireless data network access for a biomechantronic component. That is, in various examples, a single lighting device may both enable charging of and wireless communications for a biomechantronic component.

Some of the various examples of a lighting system discussed below and shown in the drawings includes or connects, to media to form a data communication network within the premises. The network provides data communications for equipment at the premises and will often provide, access to a wider area data network extending outside the premises, for example to an intranet or to a wide area network such as or providing access to the public Internet. Such a system also includes intelligent lighting system elements that communicate with each other via the network and/or through the network with external networks and/or other systems/devices. However, at least some of the intelligent lighting system elements at the premises are also configured to provide wireless data network access for biomechantronic components within the premises serviced by the lighting system.

Various examples discussed below and shown in the drawings include an intelligent lighting device. Such intelligent lighting device may serve as an intelligent lighting system element, as discussed above and further below, or may be a stand-alone lighting device. Furthermore, in at least some of the examples, the intelligent lighting device is configured to enable charging of a power source of a biomechantronic component within or attached to a biomechantronically enhanced organism. The intelligent lighting device, either stand-alone or as part of a lighting system, may enable charging of the biomechantronic component's power source in conjunction with and/or under control via wireless data network access provided to the biomechantronic component by the lighting device.

The intelligent lighting system elements include a number of lighting devices, at least one light controller for a lighting-related user interface (e.g. analogous to a wall panel) and/or at least one standalone lighting-related sensor. Each of the intelligent lighting system elements has a communication interface system configured to provide data communication via a link to the system's data network. In the examples, the communication interface system in a number of the intelligent lighting system elements, e.g., in two or more intelligent lighting devices, also supports wireless data communication with biomechantronic components in the vicinity.

However, lighting at a premises is a common installation. Most if not all of the lighting devices at a premises will have a mains power connection to provide the power for the light source. User interface devices and lighting related sensors may also have connections to the power mains at the premises. In a system like that wider consideration here, the lighting system elements also have links into the data communication network at the premises. Stated another way, once the lighting system is installed, power and data communication capabilities will extend to most if not all of the intelligent elements of the lighting system. In many such premises, there will be any number of such lighting devices and a controller and/or a sensor in every room, corridor or other type of area at the premises. Stated another way, there will be a fairly substantial number of intelligent lighting system elements, with power and data communication capability deployed about the premises. Such intelligent lighting system elements therefore provide a suitable location for addition of elements in support of wireless data communication and power charging at the premises, e.g. without the need for separate data network links or power connections for separately installed wireless access points.

Hence, in the examples of the system as discussed below, each of some number of the intelligent lighting system elements has a communication interface that supports wireless communication with one or more biomechantronic components in one or more biomechantronically enhanced organisms by providing a wireless link for use by biomechantronic components in proximity to the intelligent system element. The processor of such a wireless capable intelligent system element is configured to control communications via the communication interface system to provide access to the data network of the lighting system and through that data network to the wider area network outside the premises, for non-lighting-system related communications of the biomechantronic components.

The processor of the lighting system element supporting wireless communication for a biomechantronic component may also permit some data communications of such biomechantronic component within range with the system element itself, with other intelligent lighting system elements, or with other biomechantronic components within range of the system element or other system elements. This type of communication with one or more system elements (as opposed to access to a wider area data network), for example, may support communication among various biomechantronic components and/or allow intelligent lighting system elements to provide some data processing service(s) in support of operations of the biomechantronic component on the premises (if deemed appropriate and/or if such services(s) would not compromise system security).

Reference now is made in detail to the examples illustrated in the accompanying drawings and discussed below.

FIG. 1A is a high-level block diagram of an example of a lighting device 11A and an example of a biomechantronic component 19. In one example, the biomechantronic component 19 utilizes radiant energy produced by the lighting device 11A to charge a local energy store 113 within the component. The radiant energy, in one example, is produced by an additional source of radiant energy 22A. Alternatively, or in addition, the biomechantronic component 19 utilizes radiant energy produced by light source 18A. In this way, lighting device 11A provides, via artificial manipulation of light source 18A and/or additional source of radiant energy 22A, radiant energy to be utilized by biomechantronic component 19 to charge local energy store 113.

The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. A lighting device, for example, may take the form of a lamp, light fixture or other luminaire that incorporates a source, where the source by itself contains no intelligence or communication capability (e.g. LEDs or the like, or lamp ("regular light bulbs") of any suitable type). Alternatively, a fixture or luminaire may be relatively dumb but include a source device (e.g. a "light bulb") that incorporates the intelligence and communication capabilities discussed herein. In most examples, the lighting device(s) illuminate a service area to a level useful for a human in or passing through the spare, e.g. regular illumination of a room or corridor in a building or of an outdoor space such as a street, sidewalk, parking lot or performance venue. However, it is also possible that one or more lighting devices have other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of light emitting unit.

In the examples, the intelligence and communications interface(s) and in some cases the sensors and additional sources of radiant energy are shown as integrated with the other elements of the lighting device or attached to the fixture or other element that incorporates the light source. However, for some installations, the light source may be attached in such a way that there is some separation between the fixture or other element that incorporates the electronic components that provide the intelligence and communication capabilities and/or any associated sensor or additional radiant energy source. For example, the communication component(s), including those for communication with biomechantronic components, and possibly the processor and memory (the 'brain') may be elements of a separate device or component coupled and/or collocated with the light source.

The example of FIG. 1A includes an intelligent lighting device 11A. Lighting device 11A has a light source 18A, a processor 21A, a memory 23A and a communication interface system 24A. Lighting device 11A may include a sensor 15A and/or an additional source, of radiant energy 22A. The additional source of radiant energy 22A includes, for example, radio wave, directional microwave, or ultrasound. Such additional source of radiant energy 22A may enable a biomechantronic component 19 to charge a local energy store, as described in greater detail below.

Communication interface system 24A includes a communication interface 25A configured to enable communication via a link to a network (not shown). As discussed further below relative to FIGS. 1B-1C, lighting devices within a room or other service area are coupled via suitable links for network data communications to form physical sub-network portions, and further communication links couple those physical sub-networks together into a premises wide data communication network. The communication interface 25A will correspond to the physical electrical and signaling protocol requirements of the particular technology adopted for the data network. For example, if the network is a wired Ethernet network, interface 25A will include an appropriate Ethernet cable connector as well as an Ethernet card to enable the lighting device 11A to communicate data in electrical Ethernet signals and data protocols over the respective wired Ethernet link.

As noted above, lighting device 11A also includes an additional source of radiant energy 22A in order to enable a biomechantronic component 19 to charge a local energy store 113. Such radiant energy includes, for example, radio wave, directional microwave and ultrasound. While the biomechantronic component 1 may utilize radiant energy provided via artificial manipulation by the additional radiant energy source 22A to charge a local energy store 113, the biomechantronic component 19 may additionally, or alternatively, utilize light, generated via artificial manipulation by light source 18A to perform charging. The generated light used to perform charging by biomechantronic component 19 may be the same light generated by light source 18A for general illumination. Alternatively, or in addition, light source 18A also includes, for example, an additional light emitter (not shown) of light of a particular character which biomechantronic component 19 utilizes to charge the local energy store 113. In still other examples, the additional source of radiant energy 22A is a light source. Whether as part of light source 18A or as the additional source of radiant energy 22A, the additional source of light, for example, is visible light or is light not visible to the human eye (e.g., ultraviolet light).

The additional radiant energy source, either as radiant energy source 22A or as an additional light emitter (not shown) as part of light source 18A may also be directional in nature. For example, radiant energy source 22A is configured to generate radiant energy that is delivered in a somewhat constrained area, much like a spotlight delivers light to only a portion of an otherwise larger area. In this example, radiant energy source 22A is further configured to adjust where such directional radiant energy is delivered. As such, as a biomechantronic component 19 moves through an area, radiant energy source 22A may adjust the delivery of radiant energy to follow or otherwise track the movement of the biomechantronic component 19 and the biomechantronic component 19 may continuously perform charging while proximate radiant energy source 22A. In a similar but somewhat different example, radiant energy source 22A is configured to generate directional radiant energy, but radiant energy source 22A is not configured to adjust where the directional radiant energy is delivered. In this similar example, biomechantronic component 19 must move into the area in which the directional radiant energy is delivered and remain within the area while performing a charging function. In this way, radiant energy is provided via further artificial manipulation by lighting device 11A.

Lighting device 11A of FIG. 1A includes, for example, a sensor 15A. The sensor 15A is integrated into lighting device 11A; and the processor, memory and communication interface of that device provide the intelligence and communication capabilities associated with that sensor 15A. Sensor 15A, for example, is used to control lighting functions, such as occupancy sensors, ambient light sensors and light or temperature feedback sensors that detect conditions of or produced by one or more of the lighting devices. Alternatively, or in addition, sensor 15A may be used to control generation and/or distribution of radiant energy. For example, sensor 15A is an occupancy sensor configured to identify the presence of a biomechantronic component 19 and track movements of the biomechantronic component 19 within the area served by lighting device 11A. In conjunction with a directional radiant energy source as described above, such occupancy and tracking sensor may control generation and delivery of radiant energy to the biomechantronic component 19.

By way of example, FIG. 1A also depicts a block diagram of the functional elements of a biomechantronic component 19 that may utilize radiant energy produced by lighting device 11A to charge a local energy store. The biomechantronic component 19 that will utilize radiant energy produced by lighting device 11A is an intelligent component in that the biomechantronic component 19 includes a processor 51 and a memory 53. The 'brain' of such a component will be coupled to and control appropriate electronics/sensors 59. The electronics and the programming run by the processor 51 to control operation of the biomechantronic component 19 will depend on the particular type of component product.

Although a biomechantronic component 19 may have other means of communication (not shown), the biomechantronic component 19 of FIG. 1A also includes at least one wireless (W) communication interface 55 that is compatible with the wireless communication capability offered by a lighting device, as described in greater detail below in relation to FIGS. 1B-1C.

The biomechantronic component 19 includes, for example, energy storage 113 and a charger 111. In the example of FIG. 1A, the charger 111 is depicted as a photovoltaic charger, but this is only for simplicity. The charger 111 may take any one or some combination of a plurality of types of chargers. For example, the type of charger 111 includes any one or some combination of: photovoltaic, piezoelectric, ultrasonic, magnetic field or microwave. The type of charger 111, in various examples, corresponds to radiant energy source 22A, light source 18A or any additional source of light generated by light sources 18A.

As discussed briefly above, charger 111 functions to capture energy produced by one or more of lighting device 11A. In turn, such captured energy is stored, for example, in energy storage 113. A biomechantronic component 19 may then draw energy from energy storage 113 in order to provide power to the various elements of the component 19. In this way, biomechantronic component 19 has access to renewable energy and can maintain continuous power for operations performed by component 19.

A biomechantronic component 19 also includes a biological interface 57 for integration with the organism within which the component operates. The precise biological interface element depends on the operational characteristics of the particular biomechantronic component 19 and the corresponding host organism. Furthermore, the extent and nature of integration is also dependent on various factors. In at least one example, biological interface 57 enables electronics/sensors 59 to monitor or otherwise receive one or more signals from the host organism, as discussed further relative to FIG. 1B.

Although FIG. 1A depicts a single lighting device 11A and a single biomechantronic component 19, this is only for simplicity. For example, multiple biomechantronic components 19 may utilize radiant energy produced by a single lighting device 11A. Alternatively, or in addition, a single biomechantronic component 19 may utilize radiant energy produced by multiple lighting devices 11A.

Figure 1B:
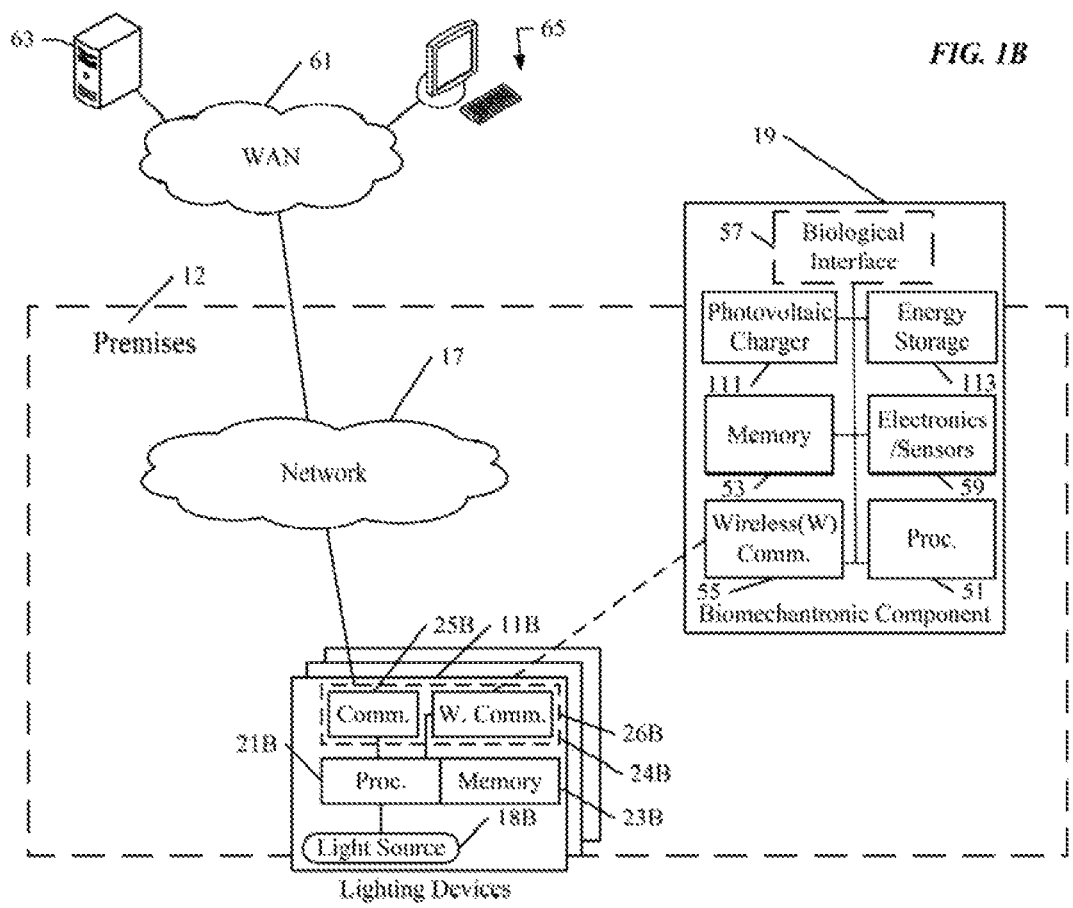
FIG. 1B is a functional block diagram of an example of a lighting device and an example of a biomechantronic component which may utilize the lighting device for network communication.

FIG. 1B is a high-level block diagram of an example of a lighting device 11B and an example of a biomechantronic component 19. In one example, lighting device 11B provides a wireless link to a biomechantronic component 19. In turn, biomechantronic component 19, in this example, utilizes the provided wireless link for data communications. Such data communications may include communications with lighting device 11B, other lighting devices within a premises 12, other biomechantronic components within the premises 12 and/or other elements either within or outside the premises 12.

The example of FIG. 1B includes an intelligent lighting device 11B. As with lighting device 11A in FIG. 1A, lighting device 11B has a light source 18B, a processor 21B, a memory 23B and a communication interface system 24B.

Communication interface system 24B includes a communication interface 25B configured to enable communication via a link to a network 17 within a premises 12. As noted above and discussed further below, lighting devices within a room or other service area may be coupled via suitable links for network data communications to form physical sub-network portions, and further communication links couple those physical sub-networks together into a premises wide data communication network 17. The local service area sub-networks may be relatively distinct from each other and distinct from but coupled to a wider area network but still within the premises 12. Alternatively, the sub-networks and premises wide media may be relatively unified to form an overall data communication network as illustrated collectively at 17. Various network media and protocols may be used for the data communications. Although not separately shown, many installations of the network 17 will include one or more routers, and at least one router or other data communication device will serve as a gateway and/or firewall for communications off-premises with a wide area network (WAN) 61, such as an intranet or the public Internet. However implemented, the network 17 allows intelligent lighting system elements within respective service areas to communicate with each other and/or allows the elements within each of the service areas to communicate with elements in other service areas.

The communication interface 258 will correspond to the physical, electrical and signaling protocol requirements of the particular technology adopted for the data network 17 in the particular premises 12 or area of the premises 12. For example, if the network is a wired Ethernet network, interface 25B will include an appropriate Ethernet cable connector as well as an Ethernet card to enable the lighting device 11B to communicate data in electrical Ethernet signals and data protocols over the respective wired Ethernet link.

Lighting device 11B also supports wireless communication with a biomechantronic component 19 within a biomechantronically enhanced organism at the premises 12. Hence, in the example, lighting device 11B has a communication interface system 24B configured both for data communications through the network 17 and for wireless data communications with the biomechantronic component 19. The communication interface system 24B may be a single interface configured for both types of communication or may utilize multiple interfaces configured for the different types of communication. In the example, the system 24B includes a first communication interface 25B for data communication via the network 17, as discussed above. The communication interface system 24B also includes a wireless communication interface 26B.

Although the interface 26B may utilize readily available standardized wireless communication technologies, the wireless interface 26B as well as compatible interfaces in the biomechantronic component 19 will typically operate at relatively low power. The wireless communication interface 26B may utilize any suitable available wireless technology, for example, WiFi Bluetooth or Zigbee or mobile 4G direct wireless or pico or femto cell mobile wireless, etc. For discussion purposes, we will assume use of a standardized wireless communication technology, like one of the enumerated examples. Although the radio frequency or other electromagnetic signal communications over the air will conform to the applicable standard, the power level(s) used in the examples is/are set below the maximum level(s) permitted under the applicable standard. As a result, the wireless coverage range provided by such otherwise standard compliant wireless data transceivers in the interface 26B will typically be shorter than normally achieved using standard compliant wireless equipment. Power level of wireless operation of the wireless communication interface 26B and/or its effective range may be 15% or less, say 5-10%, of a normal level for a hotspot or wireless access point or the like operating under the particular standard. If WiFi is used, as one example, if a typical WiFi wireless access point for a hotspot or the like might operate at a power level offering a typical wireless data communication range of 100-150 feet or greater, WiFi transceivers used in the interfaces 26B might operate at approximately 10% of the normal operating power level so as to offer wireless data communication over a range of approximately 10-15 feet.

By way of example, FIG. 1B also depicts a block diagram of the functional elements of a biomechantronic component 19, similar to that depicted in FIG. 1A.

The biomechantronic component 19 is an intelligent component in that each biomechantronic component 19 includes a processor 51 and a memory 53. The 'brain' of such a component will be coupled to and control appropriate electronics/sensors 59. The electronics and the programming run by the processor 51 to control operation of each particular biomechantronic component 19 will depend on the particular type of component product.

Although a biomechantronic component 19 may have other means of communication (not shown), the biomechantronic component 19 that will communicate with or through lighting device 11B also includes at least one wireless (W) communication interface 55 that is compatible with the wireless communication capability offered by lighting device 11B. Like the interface 26B discussed earlier, the wireless (W) communication interface 55 may utilize readily available standardized wireless communication technologies, and the wireless communication interface 55 within the premises 12 will typically operate at relatively low power. The wireless communication interface 55 may utilize any suitable available wireless technology, for example, WiFi or Bluetooth, or Zigbee or femto or pico cell mobile wireless, etc. For discussion purposes, we again assume use of a standardized wireless communication technology, like one of the enumerated examples.

Although the radio frequency or other electromagnetic signal communications over the air will conform to the applicable standard, the power level(s) used in the examples is/are set well below the maximum level(s) permitted under the applicable standard. As a result, the typical ranges over which the transceiver of interface 55 may be able to communicate will typically be shorter than normally achieved using otherwise standard compliant wireless terminal device equipment. As a complement to operation of the wireless interface 26B, power level of wireless operation of the wireless communication interface 55 in the biomechantronic component 19 and/or its effective range may be 15% or less, say 5-10%, of a normal for a wireless device (e.g. wireless adapter or the like) operating under the particular standard. If WiFi is used, as one example, if a typical WiFi wireless adapter or the like might operate at power levels offering a typical wireless data communication range of 100-150 feet, WiFi transceiver used in the interface 55 might operate at approximately 10% of the normal operating power level so as to offer wireless data communication over a range of approximately 10-15 feet.

Continuing with the type implementation, as one example, the wireless communication interface 55 may take the form of an air interface card or the like configured to operate as a WiFi adapter. However, the actual transmitter and receiver included in the interface card would at least be set-up to operate at low power corresponding to the low power communications of the matching interfaces in the lighting system elements. In many cases, the manufacturer of the biomechantronic component 19 may design their device to include only low power implementations of the transmitter and receiver, e.g. as a cost saving measure and/or to conserve power required to operate the respective type of biomechantronic component 19.

The biomechantronic component 19 also includes, for example, energy storage 113 and a charger 111. As discussed above relative to FIG. 1A, such charger 111 may utilize radiant energy produced by a lighting device to charge energy storage 113.

A biomechantronic component 19 also includes a biological interface 57 for integration with the organism within which the component operates. The precise biological interface element depends on the operational characteristics of the particular biomechantronic component 19 and the corresponding host organism. Furthermore, the extent and nature of integration is also dependent on various factors. In at least one example, biological interface 57 enables electronics/sensors 59 to monitor or otherwise receive one or more signals from the host organism. For example, biomechantronic component 1 may take the form of an enhanced heart monitor, similar to a pacemaker, and biological interface 57 enables electronics/sensors 59 to monitor heart function within the host organism. In this example, results from monitoring the heart may then be communicated via the wireless data network provided by lighting devices 11 and through network 17 to an interested authorized entity or individual (e.g., a cardiac specialist retained to provide care for the host organism).

As with FIG. 1A, FIG. 1B depicts a single lighting device 11B and a single biomechantronic component 19, but this is only for simplicity. Multiple biomechantronic components 19 may, for example, utilize a single lighting device 11B to exchange data communications. Alternatively, or in addition, multiple lighting devices 11B may provide multiple wireless links for use by one or more biomechantronic components 19. Furthermore, while FIGS. 1A-1B depict lighting devices 11A, 11B as standalone devices, no such requirement exists. As depicted in FIG. 1C and described further below, lighting devices 11A, 11B may be integrated into a networked lighting system.

Figure 1C:
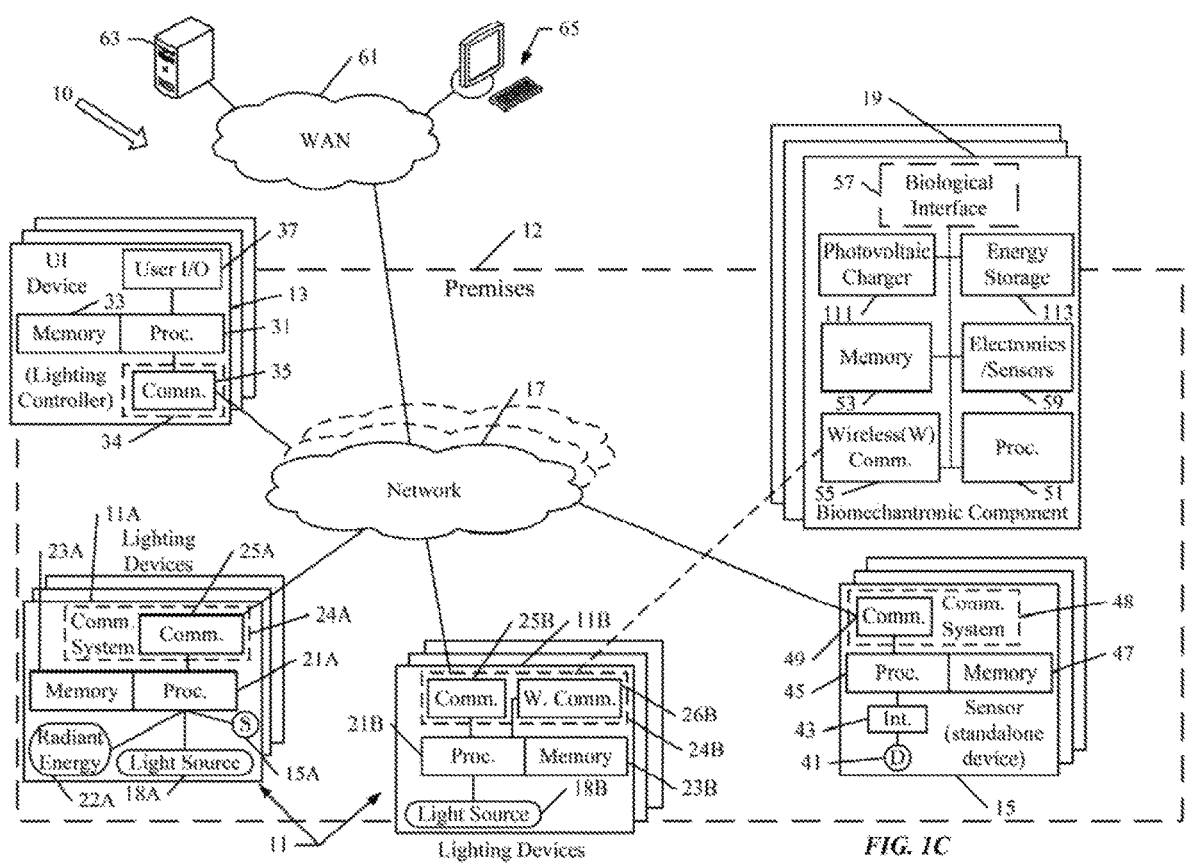
FIG. 1C is a functional block diagram of a simple example of a system having intelligent lighting devices and other intelligent system elements for lighting related functions linked or networked for data communications, which also supports charging of and network communications with biomechantronic components.

FIG. 1C is a high-level block diagram of a networked lighting system 10, many elements of which are installed at a premises 12. In addition to lighting, sensing and communications of typical system elements, the networked lighting system 10 provides services to a biomechantronic component 19 and through the component 19 to a biomechantronically enhanced organism or "cyborg" (see also FIGS. 2-4). Similar elements depicted in FIGS. 1A-1B have the same reference numbers and will not be described again with the same amount of detail.

The premises 12 may be any location or locations serviced for lighting and other purposes by a networked intelligent lighting system of the type described herein. Most of the examples discussed below focus on building installations, for convenience, although the system may be readily adapted to outdoor lighting. Hence, the example of system 10 provides lighting and possibly other services in a number of service areas in or associated with a building, such as various rooms, hallways, corridors or storage areas of a building and an outdoor area associated with a building. Any building forming or at the premises, for example, may be an individual or multi-resident dwelling or may provide space for one or more enterprises and/or any combination of residential and enterprise facilities.

The lighting system elements, in a system like system 10 of FIG. 1C, may include any number of lighting devices 11, such as fixtures and lamps, as well as lighting controllers, such as switches, dimmers and smart control panels. The lighting controllers may be implemented by intelligent user interface devices 13, although intelligent user interface devices on the system 10 may serve other purposes. The lighting system elements may also include one or more sensors used to control lighting functions, such as occupancy sensors, ambient light sensors and light or temperature feedback sensors that detect conditions of or produced by one or more of the lighting devices. If provided, the sensors may be implemented in intelligent standalone system elements 15, or the sensors may be incorporated in intelligent lighting devices, e.g. as an enhanced capability of a lighting device, or in UI devices. The lighting system elements 11, 13, 15, in a system like system 10 of FIG. 1C, are coupled to and communicate via a data network at the premises 12. A system like that shown in the drawing may incorporate or at least provide communication capabilities and/or other services for use by biomechantronic component 19. Such a biomechantronic component 19 is installed, for example, within a biomechantronically enhanced organism operating within premises 12.

Hence, in our example, each room or other type of lighting service area illuminated by the system 10 includes a number of lighting devices 11 as well as other system elements such as one or more user interface (UI) devices 13 each configured as a lighting controller or the like and/or one or more sensors. In the example, some lighting devices 11A are enhanced by the inclusion of a sensor 15A. However, sensors also may be provided as standalone system elements as shown at 15. Lighting devices 11A, in the example, are also enhanced by the inclusion of an additional source of radiant energy 22A to enable, as described above, a biomechantronic component 19 to charge a local energy store. As also discussed above, lighting devices 11B include wireless communication interfaces to provide wireless data communication access for biomechantronic components 19 within wireless range.

Although not shown for convenience, some lighting devices 11 may not have a sensor and may not support the wireless communication for biomechantronic components 19. Conversely, some lighting devices 11 may have both a sensor and the additional wireless communication capability. Similarly, some lighting devices 11 may have the additional wireless communication capability and the additional source of radiant energy while still other lighting devices 11 include a sensor, the additional wireless communication capability and the additional source of radiant energy. For example, in some areas or premises, wireless communication access provided by some but not all system elements may be sufficient to serve the expected number of biomechatronic components 19 in the particular area or premises. As another example, there may be some areas at a particular premises where it is desirable to have wireless coverage while there are other areas at the premises in which wireless coverage is deemed undesirable or unnecessary. Alternatively, all of the lighting devices 11 at a given premises 12 may support the additional wireless communication capability and include the additional source of radiant energy.

A room or other service area will often have an appropriate number of lighting devices 11, for example, to provide a desired level of lighting for the intended use of the particular space. In many installations, the equipment in the service area also includes a user interface (UI) device, which in this example, serves as a first lighting controller 13. In a similar fashion, the equipment in the service area may include one or more sensors, each of which may be in or closely associated with one of the lighting devices 11A as represented by the sensor 15A or may be a standalone device such as 15.

For lighting operations, the lighting system elements for a given service area (11, 13 and/or 15) are coupled together for network communication with each other through data communication media to form a portion of a physical data communication network. Similar elements in other service areas of the premises are coupled together for network communication with each other through data communication media to form one or more other portions of the physical data communication network at the premises 12. The various portions of the network in the service areas in turn are coupled together to form a data communication network at the premises, for example to form a local area network (LAN) or the like, as generally represented by the cloud 17 in the drawing. In many installations, there may be one overall data communication network 17 at the premises. However, for larger premises and/or premises that may actually encompass somewhat separate physical locations, the premises-wide network 17 may actually be built of somewhat separate but interconnected physical networks represented by the dotted line clouds.

A system like that of FIG. 1C may be used for communications with biomechantronic components 19 within the premises 12 as well as with lighting system related equipment and a wide range of other entities equipment outside the premises 12. Effectively, the lighting system becomes a communication hub providing data communication access, for biomechantronic components 19 and those wanting to communicate therewith.

Light fixtures will typically have power. Other system elements, such as the user interface devices and/or any standalone lighting sensors will also typically have power. In a system like that of FIG. 1C, such intelligent elements also have network connectivity, for data communication access to the network 17 and through that network 17 to other networks on and/or outside the premises 12. In addition, to lighting elements such as 11, 13 and 15, many biomechantronic components at any given premises 12 are intelligent and configured to utilize data communication networking. A separate network for such devices could be provided, however, that incurs additional cost for equipment and installation. Hence, the biomechantronic components 19 in the example of system utilize the same network 17. Although the biomechantronic components 19 could link directly to the network 17, the example of the system 10 utilizes wireless data communication to one or more of the lighting elements such as 11, 13 and 15 that include wireless data communication interfaces.

Wired connections to the network 17 may tend to be expensive and limit the location and mobility of such biomechantronic components within the premises. Direct wireless communication with the network 17 may be feasible in some premises and/or at some locations on a particular premises 12. However, as outlined earlier, to service large numbers of biomechantronic components within a given premises, particularly without undue restrictions on location or mobility of cyborgs within the premises, the components may often operate at low power levels and thus communicate wirelessly over short distances.

Since example installation of the lighting system 10 creates a permanent and pervasive communication network throughout a facility or space, it would be beneficial to use this network to deploy many low-power radio transducers (e.g. pico or femto cells, WiFi hotspots, etc.) throughout the area served by the lighting system. In this way, biomechantronic components using radio communications could potentially use much lower power and therefore allow many more biomechantronic components, as well as many more other devices using the same wireless spectrum, to work in a building or other space while conserving the amount of expended power. Low power operation of communication elements of the biomechantronic components 19 may also extend operation times between recharging.

Hence, some or all of the lighting devices 11 and possibly one or more of the lighting controllers 13 and/or standalone lighting related sensors 15 include wireless data communication interfaces. Although the interfaces may utilize readily available standardized wireless communication technologies, the wireless interfaces as well as compatible devices within the premises will typically operate at a relatively low power. However, because there are sufficient wireless access nodes provided by the lighting system elements there is sufficient coverage throughout a substantial portion and possibly all of the premises 12 to allow biomechantronic components in the various areas of the premises to wirelessly communicate through those lighting system elements and the backbone data network 17 of the lighting system 10.

The lighting system 10 may also support autonomous discovery and commissioning. Although such discovery and commissioning amongst the system elements 11, 13, 15 may be particularly useful in system set-up, some aspects may also apply to allowing biomechantronic components 19 to communicate with or through the system 10. For example, lighting devices 11 and/or other intelligent system elements 13 or 15 may be configured to autonomously discover biomechantronic components 19 and commission discovered components at least to the extent appropriate to permit the access to the system's data network 17 and through that network to the WAN 61 outside the premises for non-lighting related communications of the biomechantronic components.

The networking within the premises 12 includes both physical and logical arrangements. For example, a network within a room or other service area for the lighting elements 11, 13, 15 also provides physical network data communication capabilities for biomechantronic components 19 within the room or other service area. The lighting elements 11, 13, 15 in a service area also will typically be logically grouped together, e.g. for coordinated lighting of the room or other type of service area. However, various sets of the lighting elements 11, 13, 15 throughout a premises 12 may be logically grouped together, in various ways for different purposes, e.g. all sensors of a particular type, all lighting devices on each floor or on a particular side of a building, etc. Much as with the lighting system elements 11, 13, 15, the biomechantronic components 19 can be logically grouped together to form logical sub-networks, based on a variety of logical relationships. For example, components by a particular manufacturer may be logically grouped and allowed to communicate with external equipment of or associated with that manufacturer (e.g. of the manufacturer's service department or of a service contractor for the manufacturer). Similarly, biomechantronic components 19, for example, may be logically grouped together and configured to exchange communications amongst various biomechantronic components 19 and/or one or more other interested authorized entities.

The wireless communication and network aspects of the system 10 enable biomechantronic components to access and communicate through the wide area network 61 outside the premises 12. In some examples of arrangements of the system 10, at least some of the biomechantronic components 19 also may communicate with intelligent lighting system elements 11, 13, 15 at the premises for processing in support of the operation(s) of such components. For example, for some functions associated with the biomechantronic components 19, one or more of the intelligent lighting system elements 11, 13, 15 may operate as a server with respect to client functionality in the biomechantronic components 19. For example, the server functionality may work as a central overseer (CO) to assist in set-up of components 19 on the system 10 and/or provide intermediate functions between the components 19 and equipment outside the premises (e.g. server relative to the device client functions in the premises, and either client with respect to an external server or server with respect to an external client terminal). Depending on the functionality and/or the processing load required for the functionality supported in the lighting system element(s), a number of the intelligent lighting system elements may be configured to perform the processing operation to support an operation of a processor of biomechantronic component(s) 19 in a distributed processing manner using processing and/or memory resources of each of some number of the intelligent lighting system elements. The distributed processing may be implemented as distributed instances of server software/functions, and/or the distributed processing may be implemented as resource sharing amongst the involved intelligent lighting system elements.

Lighting devices 11A and 11B have been described relative to FIGS. 1A-1B above. It may be helpful next to consider examples of the structures of UI device/lighting controller 13 and sensor 15.

The UI devices 13 serving as the lighting controllers in this example also are implemented as smart/intelligent devices of the lighting system, with processing and communication capabilities. Hence, each UI device/lighting controller 13 includes a processor 31, a memory 33 and a communication interlace system 34, as well as one or more input and/or output elements 37 for physical user interaction as represented generally by user I/O element 37 in the drawing. The element 37, for example, may include a toggle switch, a rotary controller, one or more sliders, a keypad and/or a touchscreen display. A touchscreen display, for example, may support touch and touch gesture input as well as visual display output. Other examples of the UI input may include a video input and associated processing for gestural control detection, a microphone, an occupancy/motion sensor, proximity sensor, etc. If provided, outputs may be visual, audible, tactile, etc. For example, a microphone and/or speaker may be used to support audible input and/or output, whereas a camera in combination with projector or display may be used to support visual input and/or output.

Although shown as a relatively integral arrangement, the communication interface system and possibly the processor and memory (the 'brain') may be elements of a separate device or component coupled and/or collocated with the user I/O element 37, e.g. in a separate module connected to the user I/O element 37.

Like the lighting devices 11, the UI devices 13 are connected to the network 17 of the lighting system 10 for data communications, with other system elements in or near the respective services areas within the premises 12 and possibly for communications with other elements or device at or outside the premises. Hence, the communication interface system 34 in each UI device/lighting controller 13 includes a communication interface 35 configured to enable communication via a link to the network 17 of the lighting system (analogous to the interfaces 25A and 258 in the lighting devices 11A and 11B). Although not shown, it may be advantageous in providing desired wireless coverage in some rooms or other types of service areas for some (one or more) of the UI devices/lighting controllers 13 to have wireless communication interfaces system 34 that include wireless communication interfaces similar to the interfaces 26B.

As outlined earlier, in the example of FIG. 1C, any sensors included in the system 10 also have or are associated with intelligence and communication capabilities. The sensor 15A is integrated into a lighting device 11A; and the processor, memory and communication interface of that device provide the intelligence and communication capabilities associated with that sensor 15A. The sensor 15, however, is a standalone device and includes its own individual intelligence and communication capabilities.

The sensor 15 includes a physical condition detector (D) 41, which is the actual device that is responsive to the particular condition to be sensed. The detector 41 may receive a drive signal; and in response to the sensed condition, the detector 41 produces a signal having a characteristic (e.g. voltage magnitude) that is directly related to a characteristic level of the sensed condition. The sensor 15 also includes a detector interface circuit (Int.) 43. The circuit 43 provides any drive signal that may be needed by the particular device type of physical condition detector 41. The detector interface circuit 43 also processes the output signal or signals from the detector 41 to produce a corresponding output, in a standardized data format, for use by the associated intelligence. The integrated sensor 15A in lighting device 11A may be implemented by a detector and interface circuit analogous to the physical condition detector 41 and the detector interface circuit 43.

The standalone implementation of a sensor 15 also includes a processor 45 and an associated memory 47. The sensor 15 also includes a communication interface system 48. Although shown as a relatively integral arrangement, the communication interface system 48 and possibly the processor 45 and the memory 47 (the 'brain') may be elements of a separate device or component coupled and/or collocated with the detector 41 and/or the detector interface circuit 43, e.g. in a separate module connected to the interface circuit 43 or with the interface circuitry 43 in a separate module connected to the detector 41.

Like the lighting devices 11 and the UI devices 13, the standalone sensors 15 are connected to the network 17 of the lighting system 10 for data communications, with other system elements in or near the respective services areas within the premises 12 and possibly for communications with other elements or devices at or outside the premises. Hence, the communication interface system 48 in each sensor 15 includes a communication interface 49 configured to enable communication via a link to the network 17 of the lighting system (analogous to the interfaces 25A and 25B in the lighting devices 11A and 11B). Although not shown, it may be advantageous in providing desired wireless coverage in some rooms or other types of service areas for some (one or more) of the sensors 15 to have wireless communication interlaces system 48 that include wireless communication interfaces similar to the interfaces 26B.

Although not shown, each of the system elements that uses power to operate as described may include a power supply circuit and, will connect to or possibly contain a power source. The lighting devices 11A and 11B may draw power from an AC grid or from a DC grid. The lighting devices 11A and 11B, for example, may draw power from alternating current (AC) mains in the building or other type of premises where the system 10 may be installed. In an AC grid type example, the power supply circuit of a particular lighting device 11A or 118 will include a light source driver circuit to process power drawn from the AC mains in any manner as may be appropriate to drive the particular type of light source incorporated in the particular lighting device. The source driver may be a simple switch controlled by the processor, for example, if the source is an incandescent bulb or the like that can be driven directly from the AC current. As another example, the drive circuit may convert AC power to one or more appropriate DC voltage and/or current levels to provide power to DC driven light source(s) such as light emitting diodes (LEDs). The power supply would also process AC power from the mains to provide voltage and/or current levels to power the elements (e.g. processor, memory and interface) serving as the device intelligence and for the communication interface.

Other system elements in each service area, such as lighting controllers or other user interface devices 13 and/or any standalone sensors 15 would likewise include appropriate power supply circuits, which may rely on AC or DC power from the mains, battery power and/or ambient power harvesting, etc., as needed to operate the components of each respective system element. Examples of ambient power harvesting include vibration responsive power generation, photovoltaics, mechanical work (e.g. EnOcean), etc.

As shown by the description of the system 10 above, the system 10 provides lighting services in areas of the premises 10 and provides wireless communications for biomechantronic components 19 at the premises. Essentially, the system 10 with its wireless communication capabilities and its data network 17 becomes the backbone or hub for data communications, e.g. for the biomechantronic components 19 within the premises.

In this way, the intelligent lighting system elements provide data network access for biomechantronic components 19 in the premises 12, typically, via wireless links. The lighting system/network 10 enables biomechantronic components 19 to communicate with other biomechantronic components 19 within the premises as well as device systems outside the premises 12. Data from devices 19 in the premises 12 becomes available to affiliated equipment/ entities outside the premises, and/or such equipment/entities outside the premises may be allowed access to control the biomechantronic components 19 within the premises 12. In many cases, the wireless capable intelligent lighting system elements and the network 17 largely serve as a conduit for data communications of the biomechantronic components 19 with off-premises equipment/entities. However, in at least some instances, one or more of the intelligent lighting system elements may communicate with and interact with one or more of the biomechantronic components 19, for example, to enable initial set-up of other devices for communications via the system 10 or possibly to provide some services in support of operations of at least some types of biomechantronic components 19.

The communication network 17 allows system elements 11, 13, 15 within the premises 12 to communicate with each other and communicate via the wide area network WAN 61, so as to communicate with other devices generally represented by way of example by the server/host computer 63 and the user terminal device 65. The network 17 and the wireless communication access to the network 17 provided by the system 10 also allows biomechantronic components 19 to communicate via the wide area network (WAN) 61, so as to communicate with outside devices such as the server/ host computer 63 and the user terminal device 65 (although the outside devices may be different from those with which the lighting system elements 11, 13, 15 typically communicate).

A host computer or server like 63 can be any suitable network-connected computer, tablet, mobile device or the like programmed to implement desired network side functionalities. Such a device may have any appropriate data communication interface to link to the WAN 61. Alternatively or in addition, a host computer or server similar to 63 may be operated at the premises 12 and utilize the same networking media that implements data network 17.

The user terminal equipment such as that shown at 65 may be implemented with any suitable processing device that can communicate and offer a suitable user interface. The terminal 65, for example, is shown as a desktop computer with a wired link into the WAN 61. However, other terminal types, such as laptop or notebook computers, tablet computers, ultrabook computers, netbook computers, and smartphones, may serve as the user terminal computers. Also, although shown as communicating via a wired link from the WAN 61, such a device may also or alternatively use wireless or optical media; and such a device may be operated at the premises 12 and utilize the same networking media that implements data network 17.

For various reasons, the communications capabilities provided at the premises 12 may also support communications of the lighting system elements with user terminal devices and/or computers within the premises. The user terminal devices and/or computers within the premises may use communications interfaces and communications protocols of any type(s) compatible with the on-premises networking technology of the system 10. Such communication with a user terminal, for example, may allow a person in one part of the premises 12 to communicate with a system element 11, 13, 15 in another area of the premises 12, to obtain data therefrom and/or to control lighting or other system operations in the other area.

The external elements, represented generally by the server/host computer 63 and the user terminal device 65, which may communicate with the system elements at the premises, may be used by various entities and/or for various purposes in relation to operation of the lighting system 10. Alternatively or in addition, the external elements, represented generally by the server/host computer 63 and the user terminal device 65, which may communicate with one or more of the other devices 19 at the premises, may be used by various entities and/or for various purposes appropriate to the various different types of other devices 19 that may be located and operating at the particular premises 12.

In some installations, either in a room or throughout a premises 12, all of the lighting devices will include a communication interface that supports the low-power wireless communications for biomechantronic components 19. However, it is also envisioned that in some installations some lighting devices 11B will include a communication interface that supports the low-power wireless communications for biomechantronic components 19, which other lighting devices 11A will not. As noted, it may also be desirable in some locations or premise to include a wireless communication interface in one or more of the UI devices/controllers 13 and/or in one or more of the standalone sensors 15. Furthermore, in any intelligent lighting system element 11, 13 or 15 that does support wireless communication, there may be one interface for one type or standard of wireless communication, or there may be one or more wireless communication interfaces configured to support two or more types/standards. For example, one element may support wireless communication in two or more distinct/noninterfering frequency bands. As another example, one element may support WiFi and either or both of Bluetooth and Zigbee.

Figure 2:
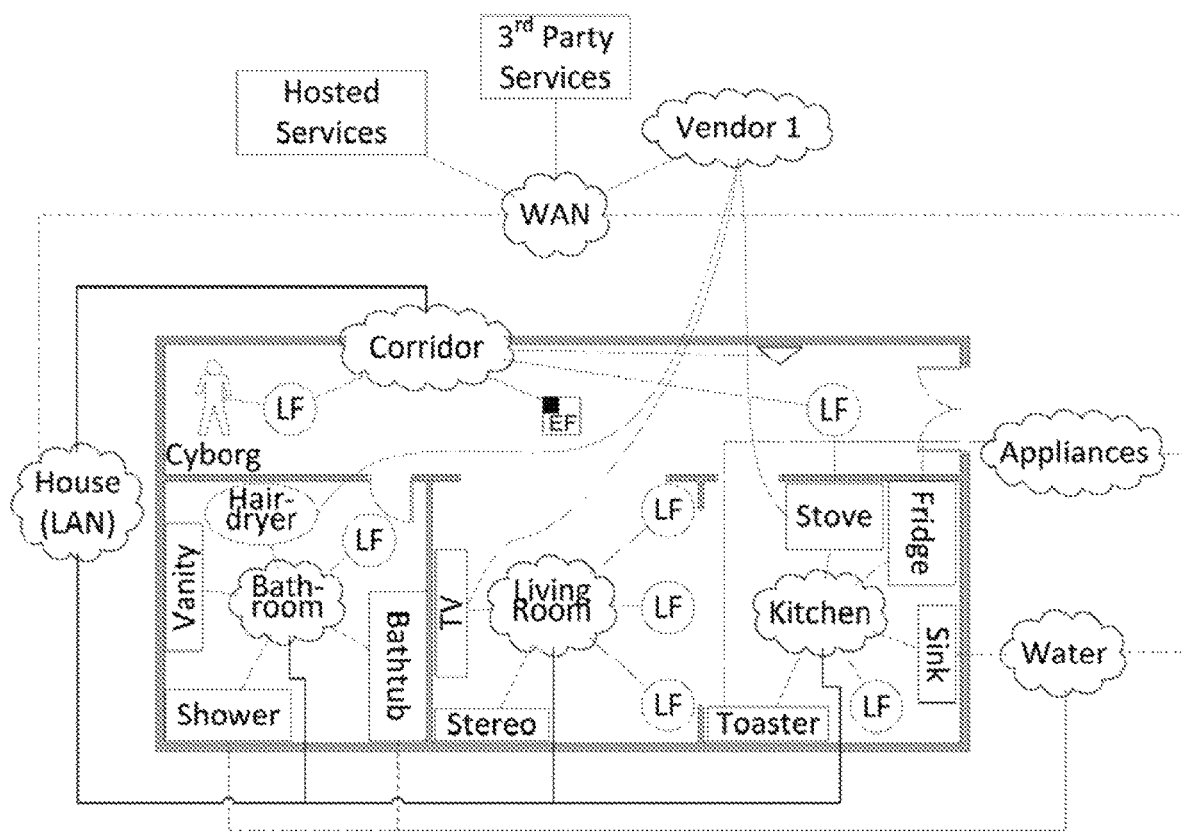
FIG. 2 is a diagram including block illustrations for elements outside a premises and a layout of a simple example of a portion of a residential building with an overlay of system elements in that portion of the premises, useful in understanding various examples of network configurations that may be implemented in and services provided by a system like that shown in FIG. 1C.

FIG. 2 shows a simple layout of a residential building or a portion of such a building with a network system of lighting devices and related equipment installed therein, similar to the system 10 discussed above relative to FIG. 1. For purposes of illustration and discussion here, the building includes three rooms along one long corridor. However, it should be readily apparent that the system under discussion here can be easily adapted to indoor installations with fewer or more rooms, more corridors, multiple floors, multiple buildings or to outdoor installations alone or in combination with in-building installations.

This layout drawing is intended to illustrate aspects of examples of the physical networking of lighting, communication and other elements of a system and biomechantronic components 19 that communicate via that system, as may be deployed in a residence in this example. This layout drawing is also intended to illustrate aspects of examples of location-related services provided to biomechantronic components 19 via a networked lighting system.

The intelligent lighting devices used in a building installation like that of FIG. 2 may be any desirable type of luminaire (L). The term luminaire encompasses lighting fixtures as well as lamps that may not be installed in a fixed manner (e.g. floor or table lamps). In our example of FIG. 2, for convenience, the lighting devices take the form of lighting fixtures, and we will assume that all of the lighting fixtures support wireless communication for biomechantronic components in the vicinity similar to the lighting devices 11B discussed above relative to FIG. 1.

In the layout example, a number of the illustrated elements/devices are represented by block symbols with descriptive acronyms. For example, a rectangle with a shaded section in the upper right corner represents a lighting fixture with one or more enhanced capabilities, or "enhanced fixture" (EF). Examples of enhanced capabilities may include increased memory, faster processor, a user interface component (e.g. gestural control sensor, microphone/speaker, video camera/projector, information display, etc.) and/or an integrated sensor for sensing a condition in relation to a lighting function or a condition for some other purpose not directly related to lighting or lighting control. Light fixtures without any such enhancement are represented in FIG. 2 by a circle LF.

The simple example of a residential premises includes a living room, a kitchen, a bathroom and a corridor. All of the intelligent lighting system elements in the rooms or corridors of the premises, coupled together into the lighting system and network, have at least some communication capability. For example, some number of such devices communicate with each other via local physical communication links. Some of the system elements may serve as a hub for communication with biomechantronic components 19 as well as some or all of the other devices. In this way, the elements in each room or area together communicate via a sub-network in the room or area. The light fixtures (LF), user interface device(s) and/or standalone sensors (not shown) in the living room together form or connect to a living room network 17*l*. Similarly, the light fixtures (LF), user interface device(s) and/or standalone sensors (not shown) in the kitchen together form or connect to a kitchen network 17*k*; and the light fixtures (LF), user interface device(s) and/or standalone sensors (not shown) in the bathroom together form or connect to a network 17*b* for the bathroom. The enhanced fixture (EF), light fixtures (LF), user interface device(s) and/or standalone sensors (not shown) in the corridor similarly together form or connect to a network 17*c* for the corridor. A house network 17*h* may include additional links and/or network gear (e.g. router, gateway, firewall, or the like) to couple the sub-networks 17*b*, 17*c*, 17*k*, 17*l* together into one overall network for the premises similar to the network 17 discussed above relative to FIG. 1. For example, the communication media and interfaces in the various intelligent lighting system elements at the premises may together form a local area network (LAN), with portions thereof in the rooms and corridor. Any suitable LAN media may be used, such as power lines wiring, separate wiring such as coax or Ethernet cable, optical fiber or wireless (e.g. pico/femto cell, Zigbee, Bluetooth or WiFi). Some or all of the network communication media may be used by or made available for communications of other gear, equipment or systems within the premises. In particular, the wireless communication capability offered by the light fixtures EF and LF provide wireless data access to the networks 17*b*-17*l* at the premises for various types of biomechantronic components 19. The network 17*h* also provides data communication access to the WAN 61.

By way of just one example of biomechantronic components 19 utilizing the networking, FIG. 2 depicts a biomechantronically enhanced organism, or cyborg, in which a biomechantronic component (not shown) is operating. In this example, the cyborg, represented as a human figure, is positioned in the corridor and connected to the corridor network 17*c* via a light fixture. Other non-lighting-system devices may also be interconnected via the various sub-networks 17*b*, 17*c*, 17*k*, 17*l* throughout the residence. For example, in the kitchen, appliances such as the stove, the refrigerator (Fridge) and the toaster utilize wireless access to communicate via the kitchen network 17*k*. An electronically controlled faucet and or any water flow or temperature sensors incorporated into or located at the sink may also utilize wireless access to communicate via the kitchen network 17*k*. In a similar fashion, an electronically controlled faucet and/or any water flow or temperature sensors incorporated into or located at the vanity in the bathroom, as well as similar devices incorporated into or located at the bathtub and/or shower, may also utilize wireless access to communicate via the bathroom network 17*b*. An appliance such as a hairdryer may incorporate a processor, memory and wireless communication interface to allow that device to utilize wireless access to communicate via the bathroom network 17*b*. In the living room in our example, the television (TV) and one or more pieces of audio gear (identified generally as the Stereo) utilize wireless access to communicate via the living room network 17*l*. In this way, a biomechantronic component 19 may utilize the low power wireless network to communicate throughout the residence with other similarly networked devices.

Briefly, in some rooms or the corridor in our example, one or more of the fixtures, luminaires, user interfaces, or standalone sensors in a particular lighting system service area may provide communications outside of the room or service area (to 17*h* in the drawing). Selection of the system element in an area that will provide the network connectivity into the LAN or the like may be based on selection criteria as part of a commissioning of the equipment in a particular service area. For example, if only one element in a room or the like has the actual connectivity, that element is chosen manually or chosen automatically by the other devices to provide, the routing function. However, if two or more elements have the capability, one may be initially selected (for any appropriate reason), but then the other element takes over the routing function, for example, in the event that the first element may later fail, or be overloaded, busy, etc., or if the communication to/through the other element is better at a particular later time.

Alternatively, the system equipment in a particular room or other service area may include a gateway (Gw) hub (not shown for simplicity). Such a gateway hub in this later type of example is a device that provides communications capabilities and is not itself configured as a device of one of the other types. A gateway hub may support communications capabilities to and from some or all of the other devices, including any number of biomechantronic components 19, within the room or other service area. In some examples, one of the other elements in the room or service area may support the communication outside the room or other service area. In other arrangements, the hub gateway provides the external network communications capabilities, although in some cases it does support the local intra device communications whereas in other examples the hub gateway does not support the local intra device communications. A gateway hub might also support other, non-lighting capabilities (e.g. memory, processing power, etc.).

The LAN/WAN combination of FIG. 2 provides communications capabilities inside and outside the premises in a manner analogous to the network 51 in the example of FIG. 1. Depending on the network media and protocol(s) used, the LAN may include a frame switch, a packet router or the like providing LAN interconnectivity. Although not shown, a gateway or the like may also be deployed on the LAN to provide various functions in support of interconnectivity of the LAN to/from the WAN.

The LAN functionality, however, may essentially be embedded in the room or area elements, except for the interconnecting media. For example, any of the system elements in each room or other service area may provide connectivity and switching/routing functions to interconnect the system elements via the applicable media to form a LAN on the premises 12. Also, one of the elements in a room or area may provide the interface to any external WAN. Hence, although shown separately for convenience, the elements that form the LAN may be integral with the lighting devices, etc., of the lighting system in the rooms or other types of areas serviced by the illustrated system. Alternatively, all intelligent system elements may connect directly to the WAN, in which case the house network is merely a premises wide logical relationship rather than a physical LAN. If the elements all connect through the WAN to a "cloud" service, the communication between elements could occur via exchange through the cloud server.

The WAN communication capability, particularly if the WAN is a relatively public network such as the Internet, may allow various parties to access the lighting network and the system elements that communicate via the network, as discussed above, for example, relative to FIG. 1.

The LAN as discussed here need not be a LAN of the type typically used today for computer or mobile device communications within a particular premises, although the lighting system may use or connect to such a network. For purposes of the present discussion, the LAN is a premises network for data communications among the lighting system elements and other devices within the promises and for data communications to/from the wide area network as discussed herein.

In a premises like that of FIG. 2, the room networks 17*b*, 17*k*, 17*l*, and the corridor network 17*c* may also represent logical groupings or sub-networks as well as physical sub-networks. Such a location-related logical group may include the intelligent lighting system elements (lighting devices and any user interfaces and/or standalone sensors) as well other devices, such as biomechantronic components 19, that use the wireless communications and data network of the system that are located in the particular service area (room or corridor in the example of FIG. 2). All elements and devices at a particular residential premises may also be part of a house-wide logical group. However, for other purposes, the system may support other logical groupings. Some logical grouping may be for lighting related purposes, although further discussion of the example of FIG. 2 will concentrate on logical groupings for other purposes. Logical groupings may be set up manually or automatically as part of an autonomous commissioning procedure.

As outlined above relative to FIG. 1, data processing equipment of a variety of entities outside the premises may access both the lighting system elements and the biomechantronic components at the premises via the WAN 61 and the system 10. In a similar manner, FIG. 2 shows equipment of an outside device vendor and generically shows equipment of hosted services and other third party services. Many communications of such outside equipment with system elements and/or with biomechantronic components at the premises are supported or enhanced by logical groupings or logical sub-networks established at the premises. FIG. 2, for example, shows a logical sub-network for various appliances at the premises. In the example, the logically grouped 'appliances' includes the refrigerator, stove and toaster in the kitchen. Vendor 1 may also have an associated logical network of on-premises devices (and possibly devices at other premises) sold or serviced by that vendor. The logical network for vendor 1 includes the stove, television and hair dryer in our example. As another example, some or all of the various devices at the premises that use or provide water to or for the occupants of the residence are logically grouped together in a logical 'water' sub-network. These logical sub-networks of other devices at the premises communicate via the wireless network access offered in the illustrated example by the various light fixtures and the media of the physical room or corridor networks and the hose network, and through those on-premises network media and the WAN with outside equipment of the appropriate other parties.

For some of the biomechantronic components, however, the outside communication may be more effective if supported by a logical grouping within the premises. Also, some of the biomechantronic components and/or features thereof may take advantage of the processing capabilities of the intelligent light system elements hi these later types of situations, the other devices may be commissioned to interact with the lighting system elements, where the device commissioning operation is similar to or a subset of the procedure for commissioning intelligent lighting related elements as parts of the system at a particular premises.

Hence, it is envisioned at that at least some installations of a lighting system of the type described herein may involve communication of at least some of the biomechatronic components 19 at a particular premises 12 with the processor of one or more of the intelligent lighting system elements 11, 13 or 15 at the premises. Such interactions may facilitate set-up of the biomechantronic component(s) 19 to communicate via or with the system 10, for example, where one or more of the intelligent lighting system elements 11, 13 or 15 at the premises acts as a central overseer to assist in commissioning of such biomechantronic component(s) 19. In other cases, one or more of the intelligent lighting system elements 11, 13 or 15 may provide an application function related to some aspect of the operation of a particular type of biomechantronic component 19. In many of the central overseer type implementations and/or application function type arrangements, the one or more intelligent lighting system elements 11, 13 or 15 involved can be configured to operate as a server with respect to a client functionality of biomechantronic components 19, to deliver a processing operation in support of operation of a processor of any of the biomechantronic components 19.

Such low power, wireless communication provided to biomechantronic components via a networked lighting system also enables various other functionality, including location related services, communication between biomechantronic components and communication with other devices. For example, a biomechantronic component within the cyborg depicted in FIG. 2 may utilize the wireless communication to determine a location of the cyborg relative to one or more system elements, other items within the premises or other portions of the premises (e.g., the biomechantronic component utilizes the wireless communication to determine the cyborg is in the corridor). Alternatively, or in addition, the biomechantronic component utilizes the wireless communication to identify, for example, a location of one or more system elements, other items within the premises or other portions of the premises (e.g., the hair dryer is currently located in the bathroom). In a further example, the biomechantronic component utilizes the wireless communication to request, retrieve or otherwise receive navigational aids, such as directions to one or more other items within the premises and guidance for navigating within the premises (e.g., the kitchen is located on the right at the other end of the corridor). The biomechantronic component may also utilize the wireless communication to provide location information to other system elements, other items within the premises and/or other entities either within or outside the premises (e.g., as part of an emergency alert, biomechantronic component notifies a responding party that the cyborg is located at the end of the corridor).

In another example, the biomechantronic component within the cyborg depicted in FIG. 2 utilizes the wireless communication to identify another cyborg (not shown). For example, a second cyborg, including a second biomechantronic component wirelessly communicating via a lighting system element, is located in the living room. Via the wireless communication, the biomechantronic component in the depicted cyborg, for example, is able to identify the second biomechantronic component, the location of the second cyborg in the living room as well as navigational aids to move from the corridor to the living room. Alternatively, or in addition, the biomechantronic component, for example, is able to exchange communications with the second biomechantronic component via the wireless communication. Similarly, the biomechantronic component within the depicted cyborg, for example, is able to identify other devices within the premises and exchange communications with those other devices (e.g., biomechantronic component exchanges control signals with electronically controlled faucet in the shower). In this way, biomechantronic components may utilize the wireless communication via the networked lighting system to enhance awareness of surroundings and interactions within and without surroundings.

FIG. 3 illustrates a further example of an exchange of communication between two biomechantronic components within two biomechantronic organisms via wireless communication provided by networked lighting devices. Although FIG. 1 depicts biomechantronic components 19 as being self-contained, this is only for simplicity. Hence, as can be seen in FIG. 3, a biomechantronic component within the left cyborg is distributed between two locations. For example, the wireless communication is implemented via an optical mechanism, such as visible light communication. Thus, the wireless communication interface of the biomechantronic component is positioned in a location providing needed visual connectivity with a lighting device while also maintaining connectivity with the biomechantronic component. At the same time, the biomechantronic component within the right cyborg is self-contained. Furthermore, as can be seen in FIG. 3, the biomechantronic component within the left cyborg is connected wirelessly to a first light fixture while the biomechantronic component within the right cyborg is connected wirelessly to a second light fixture. That is, multiple biomechantronic components need not be wirelessly connected to a single lighting device in order to exchange communications between biomechantronic components.

As discussed above relative to FIG. 1, biomechantronic components may utilize radiant energy provided by lighting devices within system 10 in order to charge local energy storage. FIG. 4 illustrates a further example of charging a biomechantronic component utilizing a lighting device. As discussed above relative to FIG. 3, biomechantronic components need not be self-contained. Thus, a biomechantronic component within the left cyborg of FIG. 4 is distributed between two locations. For example, a photovoltaic charger is located within the left cyborg such that radiant energy is most effectively captured and delivered to energy storage located elsewhere within the left cyborg. At the same time, the biomechantronic component within the right cyborg is self-contained. Furthermore, as can be seen in FIG. 4, the biomechantronic components within each cyborg capture radiant energy from the same light fixture. That is, multiple biomechantronic components may recharge energy storage from a single lighting device.

The processing by elements of the lighting system in support of processor operation of or for a biomechantronic component 19 could reside in a single lighting system element, e.g. in a single lighting device 11. However, it may be advantageous to implement such processing the lighting system on a distributed processing basis.

Figure 5:
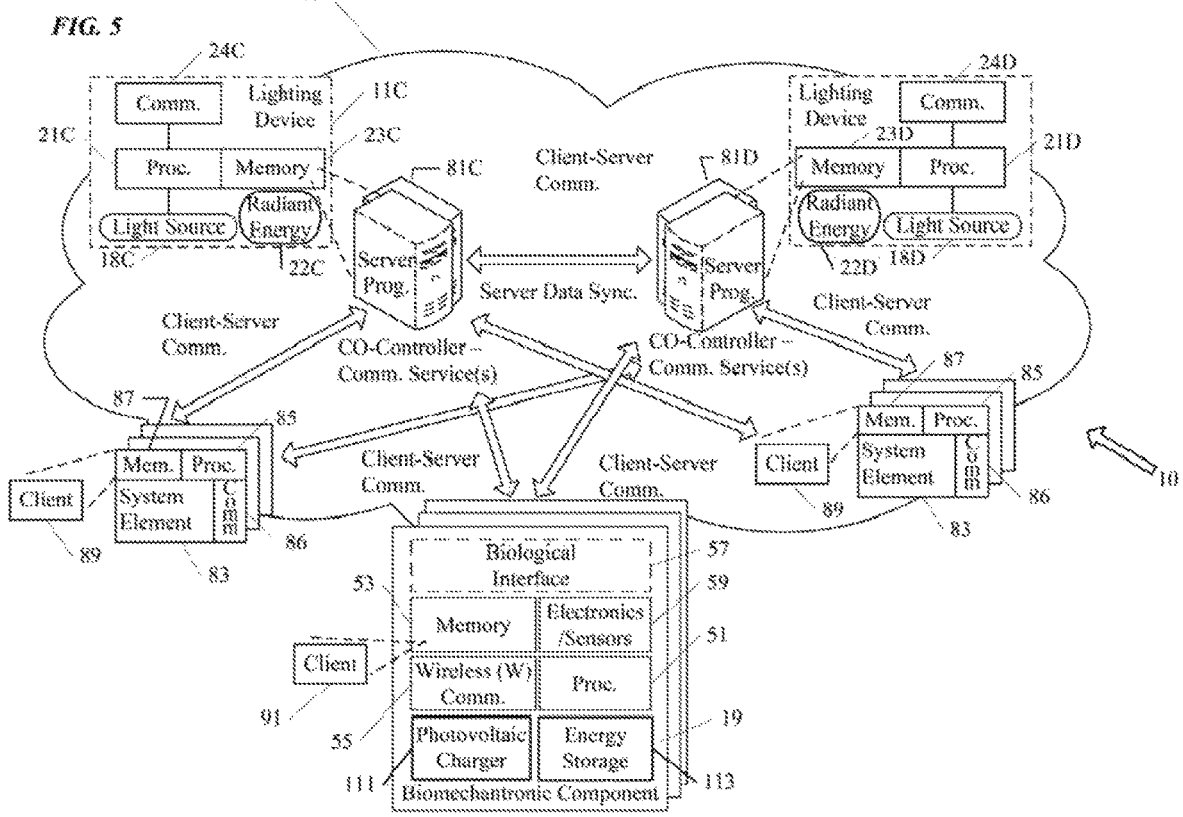
FIG. 5 is an alternative diagram of selected aspects of the system of FIG. 1C, representing an example of multiple-instance server type of distributed processing.

As discussed above, some lighting devices and possibly one or more of the lighting controllers and/or lighting related sensors of the lighting system 10 include wireless data communication interfaces. Although the interfaces may utilize readily available standardized wireless communication technologies, the wireless interfaces as well as compatible devices within the premises will typically operate at relatively low power. However, because there are sufficient wireless access nodes provided by the lighting system elements there is sufficient coverage throughout a substantial portion and possibly all of the premises to allow biomechantronic components in the various areas of the premises to communicate wirelessly through those lighting system elements and the backbone data network of the lighting system. In this way, the wireless communication and network aspects of the system 10 enable biomechantronic components 19 to access and communicate through the wide area network 61 outside the premises 12. In some examples of arrangements of the system 10, at least some biomechantronic components 19 also may communicate with intelligent lighting system elements 11, 13, 15 at the premises for processing in support of the operation(s) of such biomechantronic components. For example, for some functions associated with the biomechantronic components 19, one or more of the intelligent lighting system elements 11, 13, 15 may operate as a server with respect to client functionality in the biomechantronic component(s) 19. For example, the server functionality may work as a central overseer (CO) to assist in set-up of biomechantronic components 19 on the system 10 and/or provide intermediate functions between the biomechantronic components 19 and equipment outside the premises (e.g. server relative to the device client functions in the premises, and either client with respect to an external server or server with respect to an external client terminal). FIG. 5 illustrates an example of distributed processing and client-server functionality implemented with a networked lighting system, such as the system of FIG. 1.

Although other communication models may be used, we will assume a client-server communication relationship between a biomechantronic component 19 and a lighting system element 11, 13 or 15 providing a processing function for that biomechantronic component 19. There could be a single server function provided on one system element 11, 13 or 15, e.g. to provide assistance to a particular type of biomechantronic component 19. Depending on the functionality and/or the processing load required for the functionality supported in the lighting system element(s), however, a number of the intelligent lighting system elements may be configured to perform the processing operation to support an operation of a processor of biomechantronic component(s) 19 in a distributed processing manner using processing and/or memory resources of each of some number of the intelligent lighting system elements. The distributed processing may be implemented as distributed instances of server software/functions, and/or the distributed processing may be implemented as resource sharing amongst the involved intelligent lighting system elements.

Hence, the example of FIG. 5 will assume two or more instances of relevant server programming. Although the server programming may reside and run on UI devices and/or standalone sensors, in our example, the server programming instances 81C and 81D reside and run on two of the lighting devices, as shown at 11C and 11D respectively. Other than the server programming the lighting devices 11C and 11D are essentially the same as the lighting devices 11 discussed above relative to FIG. 1. Hence, each lighting device 11C or 11D has a light source 18C or 18D, a processor 21C or 21D, a memory 23C or 23D and a communication interface system 24C or 24D. Each communication interface system 24C or 24D will at least provide a communication link with the media forming the on-premises network 17 for the lighting system 10. Each communication interface system 24C or 24D may or may not support low power wireless communication directly with biomechantronic components 19. Although not shown, one or both of the lighting devices 11C, 11D may include an integrated sensor similar to the sensor 15A in the lighting device 11A in the earlier drawing.

Some operations of the intelligent lighting system elements may involve a server functionality. Although system element(s) running the server instance(s) for lighting system related functions could run on other system elements, for ease of illustration and discussion, the lighting devices 11C and 11D also run the programming to perform server functions with respect to client programming 89 running on some or all of the other intelligent lighting system elements. Although on the same hardware platforms 11C, 11D, the server functionalities for lighting system operations and for operations with respect to biomechantronic components may involve execution of one, two or more server programs on each platform.

Hence, for discussion purposes, the example of FIG. 5 shows other system elements 83, which here correspond to others of the lighting devices 11, UI devices 13 and stand-alone sensors of the earlier example that are configured as clients with respect to the particular server function(s) for lighting system purposes implemented on the devices 11C and 11D. Each element 83 will include a user interface, a sensor and/or a light source as in the earlier illustration, but not separately shown in FIG. 5). Each element 83 includes a processor 85, a communication interface 86 and a memory 87 similar to components of the system elements 11, 13, 15 in the earlier example. Of note, the memory 87 of each such element 83 stores a client program 89 for interaction with an associated server program 81C or 81D. The communication interface systems 86 will at least provide a communication link with the media forming the on-premises network 17 for the lighting system 10; and many of the interface systems 83 also include wireless data communication interfaces in the respective interface systems to support low power wireless data communications for the biomechantronic components 19.

The biomechantronic components 19 are similar to those shown in FIG. 1. Again, each biomechantronic component 19 includes a processor 51, a memory 55 and appropriate electronics/sensors 59. A biomechantronic component 19 also includes a biological interface 57 for integration with the host biomechantronic organism. Each of the biomechantronic components 19 that will communicate with or through the system 10 also includes at least one wireless (W) communication interface 55 that is compatible with the wireless communication capability offered by the particular installation of the lighting system at the premises. The electronics/sensors 59 and the programming in memory 53 run by the processor 55 to control operation of each particular biomechantronic component 19 will depend on the particular type of component product. Those of the biomechantronic components 19 shown in the example of FIG. 5 (those that will access the server functionality), also have client programs 91 stored in the memories 53 for execution by the respective processors 51. The client programs 91 may be similar to the client programs 89, or the programs 89, 91 may be different (e.g. if accessing different server instances or different server functions).

The biomechantronic components 19 may access the wireless communications interfaces in the system elements and through those interfaces the networks 17 and 61 (FIG. 1), essentially in a pass-through manner, with little or no interaction with the system 10 other than data transport. In a WiFi example, this would be the operation if the wireless communications interfaces and associated control functionality were set-up to operate much like a public WiFi hotspot with no security requirement and no log-in requirement. However, such an arrangement has very low security, from the perspective of the system 10; and such an arrangement leaves the operator, vendor or maintenance enterprise affiliated with system 10 little or no control over use of the communication facilities of the system 10 by biomechantronic components 19. Hence, it may be preferable to commission the biomechantronic components for operation via the system 10 in a more sophisticated manner. Such commissioning is an example of one type of function that may be performed by a server implemented in a lighting system element, such as an instance 81C, 81D of a server functionality executing on a lighting device 11C or 11D. In such an arrangement, the server functionality may operate as a central overseer for component setup and/or as a controller with respect to some or all of the biomechantronic components 19 and/or with respect to some or all of the other lighting system elements 83.

By way of another example, some lighting system element operations and/or some operations of the biomechantronic components 19 may utilize other types of server functionality, e.g., to obtain additional information or other resources in support of processing operations of the system element 83 or the biomechantronic component 19.

A single instance of a server running on one system element may at times be stressed by high processing demands. Also, a system that utilizes a single server instance for a crucial system function or service may be vulnerable to interruptions, e.g. if there is a failure of the element or of communication with the element running the server instance. To address such possible concerns, a system 10 can run some number of separate instances of a particular server functionality, in parallel with one another on multiple intelligent system elements. Each such server instance would utilize a copy of the relevant server programming and a copy of any data or database needed for the particular system service. Use of multiple instances of the servers may also speed up response time when interacting with clients implemented on the other system elements.

To the extent that data used by the server functionality may change over time of operation of the system 10, the server instances would coordinate with each other to update the copy of the data/database at or used by each instance of the server, e.g. to maintain synchronism as between multiple instances of the relevant data. FIG. 5 is a simplified illustration of such an arrangement. Alternatively the data used by the server functionality may be stored in a distributed manner across multiple elements (e.g. as distributed hash tables) to minimize the synchronization operations.

Hence, in the example, two of the lighting devices 11C and 11D run instances 81C and 81D of server programming for execution by processors 21C and 21D thereof. The server instances 81C and 81D configure those lighting devices 11C, 11D to operate in a distributed processing fashion to implement a server function with respect to an overall processing functionality and related server communications via the data communication network, generally represented again by the cloud 17. The overall processing functionality offered by the server instances 81C, 81D may be a lighting system functionality, e.g. as used or consumed by lighting device clients 89; and/or the overall processing functionality offered by the server instances 81C and 81D may be a functionality as used or consumed by other non-lighting system device clients 91.

The server program instances 81C, 81D are represented generally by icons similar to hardware devices such as server computers; but the program instances 81C, 81D are actually server programming stored in memories 23C, 23D for execution by the processors 21C, 21D (hence, the servers 81C, 81D are shown in dotted line form). As outlined earlier, the processing function of the system implemented by such server instances may relate to a CO functionality, some type of controller service, a central communication function/service, or a processing service related to operations of processors 51 of biomechantronic components 19. Also, although only two instances 81C, 81D of each server program are shown, there may be any appropriate number of such instances for implementation of a particular function or service in a system of a particular size and/or complexity. Also, for different functions, there may be other servers running as multiple instances of other server programs running on the same or different lighting system elements.

The lighting devices 11C and 11D are shown in this drawing as examples of intelligent system elements that may store and execute server programming instances. It should be noted, however, that intelligent sensors, user intelligent interface devices or other intelligent elements of the system 10 (FIG. 1) or communicating through the on-premises data network of the system 10 may store and execute server programming instances instead of or in addition to the intelligent lighting devices 11C and 11D. One set of server instances may implement the server-side aspects and communications with respect to one or any number of system functionalities. However, other processing functionalities of the system 10 may utilize server program instances stored in and executed on other system elements.

At least with respect to the particular overall processing function of the system 10 supported by the server program instances 81C, 81D, the server program instances 81C, 81D interact with some number of biomechantronic components 19 and/or some number of other intelligent system elements represented generically at 83. The other elements 83 can be any of the types of intelligent system elements discussed above.

As shown in FIG. 5, various other intelligent system elements 87 will include client programming 89 stored in memories 87 thereof for execution by the processors 85 of the other intelligent system elements 83, to configure each of the other intelligent system elements 83 to implement a client function with respect to the processing functionality of the system supported by the server instances 81C, 81D. Similarly, the various biomechantronic components 19 that will also be consumers of the server functionality will include client programming 91 stored in memories 53 thereof for execution by the processors 51 of the biomechatronic components 19, to configure each of the biomechantronic components 19 to implement a client function with respect to the processing functionality of the system supported by the server instances 81C, 81D. The client programming 89 or 91 will also support related client communications with the server function implemented by the instances of the server programming 81C, 81D on the lighting devices 11C, 11D in our example. Hence, the drawing shows arrows through the network for client-server communications between the server instances 81C, 81D and the clients 89 or 91.

In a multi-instance server implementation such as shown in FIG. 5, any one server may be able to perform on its own to handle client-server interactions with one or more elements 83 and/or biomechantronic components 19 independently of the other server instance(s), while each the other server instance(s) independently handles other client-server interactions with others of the elements 83 and/or biomechantronic components 19. To the extent that they relate to the same overall function, however, they will often use or process some of the same data. For example, if a particular processing functionality of the system involves a database, all of the relevant server instances will manipulate that same database. In our two instance server example, to insure that both instances of the server programming 81C, 81D have access to the same state of the database if or when necessary, the server instances 81C, 81D will communicate with each other through the data communication network 17 to synchronize any separate copies of the database maintained by or for the individual server instances 81C, 81D, as represented by the Sync arrow between the server instances 81C, 81D. Any appropriate data synchronizing technique may be used.

The use of multiple server instances allows for server load distribution across multiple hardware platforms of intelligent elements of the system. The use of multiple server instances may also provide redundancy in the event of impairment or failure of a system element or communications to an element executing one of the server instances. Various load distribution and/or fail-over techniques may be used.

The server functionality can provide processing operations in support of operations in biomechantronic components 19 in a variety of ways. For example, if a biomechantronic component 19 needs additional information to implement a task, it may request that information from one of the server instances 81C or 81D. If the server does not have the information, the server in turn may obtain the information from another source via the outside network 61. As another class of examples, the processor of a low-end 'brain' in a biomechantronic component 19 may not itself have the processing or memory resources to perform a task and may instead seek assistance from the server 81C or 81D, either sufficient to complete the task or as an interim assistance before seeking a final processing outcome.

As outlined above, the intelligent component of the biomechantronic component 19 has data communication to/through the fixture or the like of the lighting system and uses the lighting system's on-premises backbone data network 17 for data communication transport for the smart element of the biomechantronic component. The lighting system 10 provides a standard data communication interface, typically wireless, at low power. The biomechantronic components 19 for the premises can all be built to the standard lighting system network interface standard, e.g. to use the particular low power wireless standard. The biomechantronic components 19 need not be built to support many different standards and/or rely on a dedicated network deployed specifically for data communication purposes. The network features of the system may be sufficiently intelligent to detect each new device and negotiate communication rights. In addition, it may be advantageous to provide a relatively 'open' software architecture, e.g. so that the system supports a standard application program interface (API) at least for network interface/communications. With such an approach, application developers can draft different applications for the lighting system elements and/or for the other smart devices in the premises.

Both for telecom and for software, the issues relate to interoperability of the biomechantronic components 19 with and through the system 10, so that biomechantronic components 19 talk to the system elements as deemed appropriate, although different policies or permissions may limit the ability of one or another of the biomechantronic component 19 to communicate with or through the system 10. For example, some biomechantronic components 19 may have applications and permissions to control lighting, whereas other biomechantronic components 19 communicate through the lighting elements and the network 17 to their associated outside systems but do not control lighting or look to lighting system elements for supportive processing functions.

Many of the intelligent functions of the lighting system elements discussed above can often be performed using the processing and memory resources of one involved system element. A lighting device 11, for example, can receive, process and respond to a command from a user interface device 11 by appropriately adjusting the output of the light source 18 of the particular device 11. The server functionality may be executed in a single intelligent lighting system element. The exemplary system 10, however, implements distributed processing. One type of distributed processing is the use of multiple instances of a server functionality 81C, 81D.

Even where implemented on a distributed processing basis, by multiple instances of the server 81C, 81D, processing at one element may be sufficient to complete a particular processing operation for serving a client request. For example, when a newly installed biomechantronic component 19 requests commissioning assistance from one of the servers 81C, 81D, that server may be able to provide the information to the requesting client 91 in device 19, e.g. from data at the server or by requesting data from another source via the network.

However, the system 10 at the premises 12 may implement an additional or alternative form of distributed processing involving a processing and/or memory resource sharing functionality. Resource sharing involves an element with a processing job asking for and obtaining help from other system elements. Some processing operations of one or more of the elements of the system 10 may require more processing resources or memory resources than are available at a particular lighting system element. The system 10 therefore may be configured to support any such operation that may be more resource intensive via the resource sharing. The system may implement resource sharing for lighting system operations, e.g. to process complex sensor data at one element or across a large premises and determine how one or more of the system elements should respond thereto. The system may also implement resource sharing in support of server operations. To the extent that a server task for a centralized service is amenable to distributed processing, the system element that also is configured as the server may distribute the server processing task to other elements. The resource sharing in support of server operations may apply to lighting system related functions, e.g. to process audio or optical inputs through system elements 11, 13, 15 to recognize and respond to user commands to control lighting or the like.

However, the resource sharing in support of server operations also may apply to functions in support of operations of biomechantronic components 19. For example, if a server 81C or 81D has a request from a client 91 in one of the biomechantronic components 19, the programming executed by the particular processor 21C or 21D will allow the lighting device 11C or 11D to determine if the processing job is amenable to resource sharing type distributed processing. If so, the device 11C, 11D operating at the server interacts with other system elements to 11, 13, 15 so as to distribute the processing job, receive results, compile an overall result and then provide, a response based on the overall result back to the client 91 in the particular biomechantronic component 19.

The process flow shown in FIG. 6 represents a simple example of a resource sharing procedure for distributed processing, which may be implemented in a lighting system 10 like that of FIGS. 1C and 5.

In the example, a first lighting system element has a processing job to perform. The resource sharing may apply to jobs in support of lighting system operations and to operations in support of processing or the like by the biomechantronic components 19 at the premises 12.

The element with the processing job to perform may be any intelligent element of the system 10, although for purposes of a specific example to discuss, we will assume that the element that has the processing job or task is one of the lighting devices, and is therefore identified as device 1 in FIG. 6. The device 1 may be any system element, including a biomechantronic component 19, that may seek assistance with its own processing job; or the device 1 may be an element configured as a server having a server operation job amenable to resource sharing to assist in performance of a server-function related task. The server function may be one supporting lighting system operations, or the server function may interact with clients 91 of other biomechantronic components 19.

At step S1, the device 1 recognizes that it may be prudent to seek help to perform the task at hand, in this case, using resources of others of the intelligent system elements.

The device 1 can perform at least some tasks utilizing the element's own internal processor and memory. For example, a lighting device typically will be able to receive and appropriately process a lighting command, e.g. to set a light level and/or to set an associated color characteristic of the device's light source, to adjust its operational light output as commanded, without the need for resources of other intelligent elements of the system. A user interface (UI) device configured as a lighting controller generally will be able to send commands in response to user inputs to any lighting devices it controls; and, at least under most circumstances, a sensor will be able to report its sensed condition to any system elements configured to receive and utilize such information. However, other tasks may more readily lend themselves to distributed processing. Some such tasks with a potential for distributed processing may call for more processing or memory resources than readily available within the device 1 (e.g. without compromising core lighting functions of the device). Tasks with a potential for distributed processing typically will be tasks that can be handled in some reasonable fashion by some number of individual elements, e.g. can be readily split into sub-tasks for processing and/or storage in different elements, although there may be some tasks that by the nature of the processing or storage involved cannot readily be spilt amongst multiple elements. Some tasks may require faster completion than the device alone can provide with only its own resources and therefore best implemented via distributed processing. Conversely some resource intensive tasks may be relatively insensitive to time-to-completion and amenable to wider distribution for processing (e.g. processing of audio, image or video data).

As outlined above, the distributed processing tasks handled by resource sharing may relate to lighting system operations, general processing tasks associated with the system and/or tasks for other parties. Lighting tasks that may be amenable to distributed processing, for example, may relate to lighting control operations, e.g. to process data from numerous sensors and make some overall control decision. Such lighting system tasks may be implemented by an element operating as a server for one, of the CO/controller services. General processing tasks of the system may include, for example, processing audio or video inputs, either for a lighting control operation in response to user input in such a fashion or for some other system function or feature (e.g. to access information or a non-lighting control function in response to the user audio or video input). A task for a biomechantronic component 19 might entail processing sensor or other monitoring data from one or more of the components 19, to determine how the biomechantronic component 19 should proceed or to configure the relevant data for delivery to an outside party, either on a regular basis or in response to a specific request/instruction from the outside party or other particular biomechantronic component(s) 19. Similar processing may be handled on a distributed processing basis within the system, to process such data received from outside the system, e.g. for distribution to biomechantronic components 19 at the premises 12.

Hence, the device 1 may have a processing job to perform in response to one or more of its own inputs or in response to an instruction or the like received from another system element or from outside the system. However, if the device 1 is an element configured as a server, the device 1 may have a processing job to be performed in response to or for a communication with a client 89 or 91.

From the various factors involved in the processing task at hand, in the processing flow of FIG. 6, the device 1 will recognize that the task is one that is appropriate for resource-sharing type distributed processing, e.g. involving processor or memory intensive operations and/or not time critical, etc. Also, based on characteristics of the job, e.g. source, lighting on-lighting function, time sensitivity, or the like, the device 1 will assign a relative priority value or level to the particular processing job. The programming and/or the protocols used for signaling between system elements that may be involved in the resource-sharing type distributed processing in the system 10 can define an appropriate format and range of values for a job priority level parameter.

The device 1 will be in communication with at least some number of other intelligent elements of the lighting system 10, referred to in this process flow example as neighbors of the device 1. The neighbor elements may be other lighting fixtures, intelligent UI devices, intelligent sensors or any other type(s) of intelligent elements that are part of or communicating via the lighting system 10, such as biomechantronic components 19.

At step S2, the device 1 queries other intelligent system elements, i.e. the neighbors in the example, essentially to request help in performing the processing task or job. The queried neighbors may include any number of other elements of the system 10. A small group of neighbors, for example, might be those elements logically associated with the device in some small group or sub-network, such as elements in the same room or other service area sub-network. The queried neighbors may include all system elements on the system 10 or any sub-set of elements between the smallest size group and the complete set. As discussed more later, the sending device 1 may pick and choose which of its 'neighbors' from any particular grouping to query with regard to the current job or task, based on information about element performance learned from earlier resource-sharing type distributed processing of other tasks and/or requirements for the task at hand.

The exemplary resource sharing type distributed processing procedure includes learning features for the device that is distributing the job and for the neighbors that respond to queries or requests to contribute resources for distributed job processing and/or that actually contribute their resources to distributed job processing. The learning process on each side of the distributed processing, job sub-task distribution as opposed to offering resources and performing an allocated sub-task, help the various system elements to adapt and optimize the distributed processing operations over time. As will be discussed at various stages of our description of the exemplary processing flow, information that has been learned from distributed processing of prior jobs informs the various elements in their decisions or responses at various stages of the process. Optimization may also involve some randomization.

For learning purposes, each intelligent system element configured to distribute portions of a task may establish, maintain and store a learning table for the distribution function; and each intelligent system element configured to offer resources to another intelligent system element and if instructed contribute such resources to a distributed processing operation may establish, maintain and store a learning table for such in-bound query response and sub-task processing. Of course, many of the intelligent system elements 11, 13, 15 (or 83) may play both roles during processing of different jobs over a period of time and may learn about both sides of the distributed processing. An intelligent system element configured to participate on both sides of the distributed processing may maintain learned data about both types/sides of the operations, either in two tables or in a combined table. If separate tables are used, each table may be adjusted in response to a change in the other, in appropriate circumstances. As much, as the previous examples refer to a leaning table, no such requirement exists. Alternatively, or in addition, any learning may occur via a learning circuit, a learning algorithm and/or any other learning system.

In general, learning entails analysis of performance by an element and/or by other elements involved in handling of each distributed processing job to determine distributed processing metrics of performance. Examples of learned performance parameters that may be assessed in selecting other neighbor elements during the task distribution include turn-around time or turn-around time per unit of processed data, number or percentage of dropped packets, average amount of memory resources offered (e.g. bytes of storage) and/or amount of processing resources offered (e.g. in units related to data to be processed, number of processing cycles or average processing rate) and/or actually provided, during some number of prior distributed job processing operations. Examples of learned performance parameters that may be assessed in determining how to respond to a new inquiry for distributed processing assistance include amount of data processed, time required, resources used, delay incurred in processing of other tasks, or the like, for tasks distributed by the receiving device.

In general, the learned distributed processing metrics, of performance allows an element to prioritize one or more lists of neighbors/other elements for use in making decisions and selections based on highest relative ranking on the applicable list. For distribution, the device 1 may select some number of the highest ranking neighbors. In contrast, an element offering to take part in a distributed task may choose whether to offer to help or how much if any of that element's resources to offer based on the ranking of the particular requesting device 1, based on learned distributed processing metrics of performance. With such an approach, an element tends to select or respond most favorably to the highest ranked element(s) in the particular prioritized listing, in an effort to optimize operations.

When decisions in the process (e.g., FIG. 6) are made based on the learned performance metrics about other elements, however, the element making the decision can introduce a random variation in the decision, for example, to select or respond to a lighting device or other element that has not or seldom been chosen or favored at the particular decision point in the past. As a result, the element making the selection or response will from time to time randomly select or favor another element that would otherwise appear as less than optimal based solely on the previously learned performance information. However, this allows the selecting or responding element to learn more about the randomly chosen element for future processing purposes and update the parameters in the learned table(s) for optimization of future distributed processing operations. A random variation of this type, for example, may allow the element making the decision to discover changes and adjust its learned information accordingly, for better optimization of future distributed processing operations.

Returning to the process flow of FIG. 6, in a particularly intelligent implementation of the resource-sharing type distributed processing, the device with the task to distribute can select among elements in some group or sub-group based on performance data about elements in the group or sub-group learned from prior job distribution operations for sending the query in step S2. The learned performance parameters for job distribution enables the device 1 to prioritize a list of neighbor elements for job distribution and to query some number of the highest priority elements likely to offer and provide sufficient resources to handle the particular task at hand. Only a few may be chosen from the high-end of the priority list for a small task, whereas the sending device 1 may select more or all of the neighbors to query for a larger task. As the process is repeated over time for multiple distributed processing tasks, the device 1 will tend to most often choose the other elements that are rated higher for performance based on the learned performance parameters, for the query step. Lower rated elements will be selected less often. However, the priority for such selection for the query step S2 may change over time as conditions at other elements change and the sending device 1 updates its learned performance metrics accordingly; and the occasional randomization of the neighbor selection can enhance the process of learning about changes.

The device 1 sends the query message through the network media used in the relevant portion(s) of the system 10 installed at the particular premises 12, to the neighbor chosen initially for purposes of the inquiry about the current task processing. The inquiry, for example, may be sent as a broadcast, sent as a multicast to selected neighbors or sent as individual data messages to each of the selected neighbors, depending on the network media and/or data communication protocols utilized by the particular system implementation.

The request message for the query in step S2 will include at least some information about the current job, including the assigned job priority level. The information in the query, for example, may also provide various metrics, about the task at hand and/or the sub-tasks thereof being distributed to other elements. For example, such information may indicate the type of processing involved the type/format of the data to be processed, any time constraints or deadlines for sub-task completion, the overall amount of data or the expected sub-divided amounts of data to be processed by recipient neighbors, or any other parameters about the task that may be helpful in enabling the queried neighbors to determine how to respond to the query. The information about the current job may also include a job or task identifier.

Each queried neighbor element will analyze the information about the job from the query message it receives from the device 1 in comparison to its own resources, current data processing operations, status or the like. For example, the receiving element may compare the priority of the task that is to be distributed to the priority or priorities of any of its own tasks in progress or any distributed processing subtasks the receiving element may already be working on for other source elements. The receiving element may also analyze factors about the task that is to be distributed, versus what if any of its own resources that element might of and allocate to the task, in view of its ongoing processing operations and any expected higher priority tasks. For example, if the receiving element is a lighting device, that receiving element may be able to offer some resources to handle part of the task but still reserve sufficient resources to address a command to change a light setting if received while working on a part of the task.

Neighbor elements that do not have (or for various reasons will not offer) resources may not respond to the query. Alternatively, such unavailable neighbor elements may send responses, but their responses in such cases would indicate that they are not offering resources to assist in performance of the distributed processing job currently offered by the device 1. In the example, the device 1 will adjust its learned table about its neighbors to reflect any neighbors that do not offer to assist in the distributed processing job, e.g. to indicate other elements did not respond or indicate any reason given in a response declining to participate.

Each receiving element that has resources available will set a request timeout and send a reply message back through the network to the device 1 (S3). This period essentially is a time limit during which the neighbor will wait for further instructions about the job. However, if the timeout period expires (S4) without follow-up instructions about the job from the device 1, then the neighbor will release the promised resources at step S5, in this scenario, without having processed any part of the task at hand. In this way, the unused resources are available for other uses by the neighbor or for other distributed processing operations. After releasing the resources, the neighbor element will update its learning table about distributed processing offered by other elements, as shown at S6. In the timeout scenario (that passed through S4), for example, the neighbor will update its learned performance metric information about device 1 to reflect that device 1 did not send a sub-task to the neighbor after the neighbor offered resources in response to the query. The neighbor can use such performance metric information in future to adjust its responses to future queries from device 1.

Returning to step S3, as noted, at least the neighbors that have and will offer available resources send back a reply message, which is received at the device 1. Each reply from a device offering to participate in the distributed processing operation will include information about the resources of the neighbor element which that element is offering to make available for sub-task processing of the currently offered job. Examples of such available resource information include: processing power, memory, software/capability, reservation time, etc. Each reply may also indicate the relative priority of any local task or prior distributed processing task that is already in progress on the responding neighbor element. In this step S3, the requesting device 1 will receive similar replies from some number of its neighbors, indicating whether or not the other intelligent system elements have processing or memory resources available for the processing job. In our example, at least some of the replies from neighbors offering available resources provide information about the resources that each other element offering to help in the distributed task processing can make available. In the example, the device 1 will adjust its learning table about its neighbors to reflect those neighbors that offered to assist in the distributed processing job and/or to reflect the resources each such neighbor offered in response to the inquiry sent in step S2.

In step S7, the device 1 with the task to distribute analyzes potential candidates for distributed processing of the task, for example, to prioritize a list of the neighbor elements that responded (respondents, in the drawing). The device 1 can prioritize the respondents based on information contained in the responses, for example, based on information about the resources each is offering and/or priority of any other tasks the respondents are already processing. The device 1 can also prioritize the respondents based on learned information regarding performance metrics of the respondents that the device 1 selected and used to assist in prior distributed processing operations.

The device 1 in our example will also know the priority and requirements of the data processing task that the device 1 is trying to distribute. From the prioritized list created in S7, the device 1 can now select an appropriate number of the respondents starting at the highest rank and working down through the list to select a sufficient number of the respondents to provide the resources to meet the requirements of the particular data processing task.

The device 1 essentially allocates portions of the processing job to the selected respondent elements. Hence, at step S8, the device 1 creates work packets for the selected respondents. By work packets here, we do not necessarily mean IP packets or the like, but instead are referring to sets of instructions and associated data for the portions of the job that the device 1 allocates to the selected respondents. For large processing jobs, for example, in a system using IP packet communications over the network media, each 'work packet' for a sub-task allocated to a selected respondent may utilize some number of IP packets addressed to the particular respondent neighbor element. The device 1 may send one, two, or more work packets to each of the selected respondent neighbor elements. In our example, the distributing device 1 stores a record of each work packet and an identifier of the neighbor element to which device 1 assigned the particular work packet.

It should be noted that, although the various examples above and further below primarily describe distributed processing in the context of available physical resources (e.g., memory, processor), no such limitation exists. Alternatively or in addition, various neighbor elements may provide data resources to device 1. For example, some number of neighbor elements may include a sensor, such as a temperature sensor. This number of neighbor elements may also store historical data sensed by or via the sensor (e.g., periodic temperature readings). If, for example, device 1 has need for a statistical or other data resource (e.g., average temperature over a period of time), device 1 can utilize the process of FIG. 6 to request such statistical or other data resource. Those neighbor elements having the requested data resource, such as the number of neighbor elements including a temperature sensor, would reply accordingly and, in this example, each work packet might only include the appropriate instructions to request such data resource. In a further example, device 1 may request both one or more data resource(s) and one or more physical resource(s). In this further example, some number of neighbor elements may be able to provide both the one or more data resource(s) and the one or more physical resource(s) while a different number of neighbor elements may only able to provide the one or more data resource(s) and a still different number of neighbor elements may only be able to provide the one or more physical resource(s). Furthermore, data returned as a result of a requested data resource may in turn be provided in a work packet as part of a physical resource request.

The work packets created for each selected respondent may be tailored to the particular respondent. For example, respondents offering more processing or memory resources may be sent more of the data to process. Respondent elements with particularly advantageous capabilities (e.g. a video processor not currently engaged in another processing task) may receive task assignments particularly suited to their capabilities. The allocations and associated work packet creations also may be adjusted based on the learning table. For example, if a particular respondent has performed better in the past when handling a somewhat smaller data allocation, the device 1 may limit the data allocation for that element accordingly.

In the process flow of FIG. 6, in step S8, the device 1 sends the work packets to the selected respondents through the network communication media of the lighting system 10. Although not shown for convenience, the system elements may be configured to require an acknowledgement of each work packet. In such an arrangement, a neighbor would send an acknowledgement message back through the network to the distributing device 1. If no acknowledgement is received from a particular neighbor, after some number of one or more retries the distributing device 1 could select a lower priority neighbor from the list used in step S8 and try sending the undelivered work packet to the alternate neighbor in a similar fashion. Each work packet sent/delivered to a neighbor will include a portion of the data to be processed for the particular task as well as instructions as to how the data in the work packet is to be processed, essentially to enable each respondent to perform an allocated portion or sub-task of the distributed processing job. Each work packet may include an identifier of the overall processing job and/or an identifier of the particular assigned sub-task.

At this point in the discussion, we will assume that each intelligent system element that receives a work packet for an allocated portion of the distributed processing job will successfully complete and return results for the portion of the job allocated thereto. Several scenarios in which work packets are dropped without sub-task completion will be discussed later.

Hence, at this point in our exemplary process flow, each of the neighbor elements that the device 1 selected for a sub-task receives one or more work packets containing data and instructions for that sub-task as part of the communications in step S8. The element receiving the work packet performs its allocated portion of the processing job on the received data, in accordance with the instructions, using resources of the processor and/or memory of the receiving element of the lighting system (step S9). At step S10, each selected respondent neighbor element sends a result of its sub-task processing back through the data communication network of the system 10 to the device 1. In our example, each of the work result packets sent back to the distributing device 1 includes an address or other identifier of the responding neighbor element that performed the sub-task as well as an identifier of the overall task/job and/or an identifier of the respective sub-task.

Upon sending sub-task results in step S10, each respondent neighbor element will release the resources utilized in processing the sub-task, at step S5. The resources become available again for other uses by the neighbor or for other distributed processing operations. After releasing the resources, the neighbor element again will update its learning table about distributed processing (at S6), in this case, the sub-task processing that the element performed for the device 1. In the completed sub-task scenario, for example, the neighbor will update its learned performance metric information based on analysis of the task of device 1. To reflect the size of the assigned sub-task, the amount of resources and/or time utilized, what if any other tasks of the respondent neighbor element were delayed during this distributed processing operation, or the like. The neighbor can use such learned performance metric information in future to adjust its responses to future queries from device 1.

Returning to the result transmission step S10, as a result of the transmissions from the neighbors selected back in step S10, the device 1 will receive processing results or the sub-tasks from other intelligent system elements. In step S11 in our example, the device 1 compiles the received results and checks the composite result to determine if any work packets were dropped or if there are any readily apparent errors. Sub-task identifiers and/or a combination of the overall task identifier and the neighbor address/identifier may assist the device 1 in combining sub-task results from the various participating neighbor elements into the appropriate overall composite result. At this point in our discussion, we will assume that no packets were dropped and no errors are detected. Hence the compiling of the results of the allocated sub-task processing from the other system elements assisting in the current distributed processing operation essentially determines an overall result of the processing job.

Processing by the device 1 proceeds to step S12. In which the device 1 reports the overall result. The report function here is given by way of just one example of an action that the device 1 may perform based on the overall result of the processing job. The report may be sent to a higher level processing element or service, e.g. a higher level control service 57 or to an outside system management device 53 or 57. However, where the device 1 is also a server with respect to a client 89 or 91, report may be a transmission of the processing result or a command or the like corresponding to the result back to the particular client 89 or 91.

As other samples, reporting the result may involve taking some action in the device 1, accessing data via the network, sending a face or voice recognition result to an outside device of another party, etc. Of course, the device or any other system element may act in any of a variety of other ways based on the overall result of the distributed processing operation.

Returning to the exemplary processing flow of FIG. 6, upon completion of the shared resource type distributed processing job, e.g. upon reporting the overall result in S12 in our example, the device 1 will also update its learning table (step S13) to reflect the performance of various other system elements with respect to the just completed job. For example, the table may be updated to reflect devices that did or did not offer resources in response to the query. The learning table may be updated to reflect successful completion by some of the other/neighbor elements versus packets dropped or errors created by processing sub-tasks by still others of the neighbor elements. As outlined earlier, the device 1 can utilize the learning table updated in step S13 to improve its neighbor selections (e.g. at steps S1-S2 and steps S7-S8) in future distribution of jobs amongst its neighbors.

If sufficient resources are available and/or enough other elements respond, some or all of the work packets sent out at step S8 may be duplicated and sent to two or more of the selected respondent neighbor elements, for redundant processing. When the device 1 compiles the results at S11, it may receive duplicate sub-task processing results. If the device 1 detects errors, in many cases, at least one of the duplicative sub-task processing results may be successful and free of errors; and the device 1 can utilize the error free results and discard the duplicate version that is subject to errors. In some cases, an element that accepted a sub-task may not respond, at least in a timely fashion. From the perspective of device 1, the work packet sent to such an element has been 'dropped.' However, if another element assigned the same sub-task successfully completes its processing of that sub-task, the device 1 can still compile the overall job result using successfully completed sub-task result from that other respondent. Hence, duplicative allocation of sub-tasks can improve likelihood of successful completion of the distributed processing task. However, in some cases, problems may still arise. In any of these cases, the update of the learning table in step S13 will reflect such outcomes with respect to the performance metric data stored in the table relative to the respective neighbor elements.

Assume next that when the device 1 checks results in step S11, and there the device 1 determines that some portion of the job has not been successfully completed. In this situation, the device 1 determines at step S14 that some rework of the job is necessary. If capable, the device 1 may perform any additional processing needed itself. If not, however, then the device can again distribute some or all of the sub-tasks to other system elements. In our illustrated example, depending on the type and/or amount of further data processing required to complete the distributed processing task, processing, flows from step S14 hack to S1 or S7 and from there through the other steps of the process, essentially as discussed above, to obtain distributed processing results to complete the overall data processing job.

There may be a variety of reasons why a sub-task is not successfully completed, and either the work packet is dropped or the results returned to the device 1 are subject to errors. For example, some communication media may be subject to communication-induced errors too extensive to address with routine error correction technologies. In other cases, some part of the data network of the system 10 may be down or congested. However, in other cases, events at one or more of the selected respondent neighbor elements may result in a dropped work packet, as reflected in our exemplary process flow at steps S15 and S16.

Returning to step S9, the various neighbors that responded, were selected and received work packets are processing data from the packets in accordance with the associated data processing instructions. The overall processing job, and thus the sub-tasks thereof, will have an assigned priority. Other tasks handled by the various intelligent system elements also have assigned priorities. At step S15, one of the system elements that has been processing data from the work packets at S9 now receives (or internally generates) an interrupt in view of an apparent need to perform some other task having a higher priority than the particular distributed processing job. That element will suspend its processing of the allocated sub task and perform the processing for the higher priority task. Depending on the resources and time taken for the higher priority task, the element may be able to resume sub-task processing after completing processing for the higher priority task and still deliver its sub-task results within the timeframe set for the particular distributed processing job. If not, however, then the system element will drop the processing of the work packet of the particular distributed processing job (step S16), to process the higher priority task. In this later situation, the element will release the promised resources at, step S5. After releasing the resources, the neighbor element will update its learning table about distributed processing offered by other elements, as shown at S6. In the interrupt scenario (that passed through S15), for example, the neighbor will update its learned performance metric information about device 1 to reflect that the respondent neighbor element was unable to complete, the sub-task before dropping the packet to handle the interrupt for a higher priority task.

Although not discussed in detail, the device 1 may also process some portion data or otherwise perform some sub-task of the distributed job before compiling the results. Alternatively, the device 1 itself may be involved as a respondent neighbor in another distributed processing operation while it waits for responses from the respondent neighbors in the job the device 1 distributed.

Although the discussion of FIG. 6 mainly focused on distributed processing amongst lighting devices, associated user interface devices and sensor devices, as noted earlier, the resource sharing implemented by a process flow like the example of FIG. 6 may take advantage of and share resources of any other type(s) of intelligent elements that are part of or communicating via the lighting system 10. For example, the lighting system 10 may be able to use the memory and/or one or more processors of a cooperative biomechantronic component 19 that is coupled to communicate via the data communication media of the lighting system 10. Although we have generally assumed a low processing capability in biomechantronic components and/or that the resource sharing assisted server or other operations on behalf of client biomechantronic components 19, if any of the biomechantronic components 19 have resources to share and are appropriately programmed, the lighting system 10 may be able to use the memories and/or processors of such other cooperative biomechantronic components. Conversely, some computers coupled to the communication media and/or some other types of cooperative biomechantronic components may be able (and permitted if appropriate) to request and obtain access to resources of the lighting devices, associated user interface devices and sensor devices available for sharing for distributed processing in a manner like that shown by way of example in FIG. 6.

The intelligent system with wireless communication capabilities is actually more sophisticated than just a deployment of wireless access points, such as WiFi hotspots, in widely spaced lighting devices, e.g. street light fixtures. The systems discussed above deploys wireless data communications nodes (operating at low power) relatively close together and throughout substantial portions or all of a premises. The deployment of numerous low power relatively short range communication nodes can support communication for many biomechantronic components at the premises.

The wireless deployment may also be adapted to support a variety of other communications, instead of or in addition to any or all of the wireless communications discussed above. For example, depending on the type of wireless technology, the wireless-capable elements of the system may be able to pick-up data from RFID tags within range. As another, example, if at least some of the wireless-capable system elements utilize mobile femto or pico cell technology, the lighting system may also provide network connectivity for compatible mobile devices when operating at the premises.

The examples of the wireless communications above focused mainly on implementations using radio frequency type wireless communications. The present concepts, however, encompass systems, system elements and devices using or communicating with the system that implement the wireless communications utilizing other wireless technologies. For example, the wireless communications may use optical communication, e.g. in the visible light spectrum, infrared light, ultraviolet (UV) light or ultrasonic waves. As another example, the wireless communications could be sonic, e.g., with text-to-speech and speech-to-text technology, the lighting system elements and the other devices could talk to each other using human comprehensible language.

Figure 8:
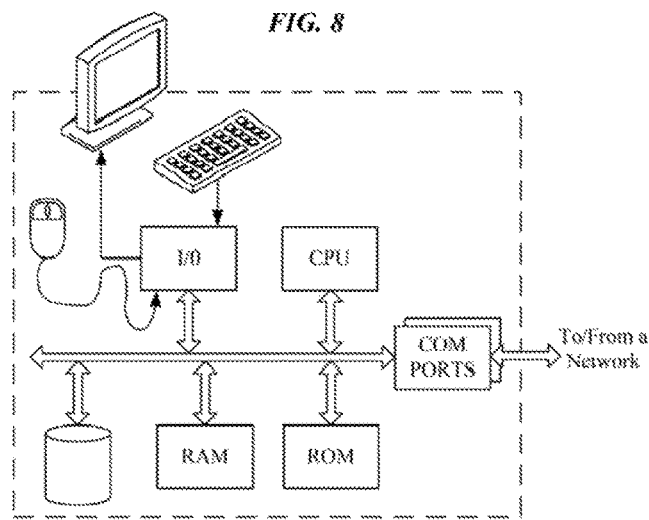
FIG. 8 is a simplified functional block diagram of a personal computer or other user terminal device, which may be used as the remote access terminal, in the system of FIG. 1C.
Figure 9:
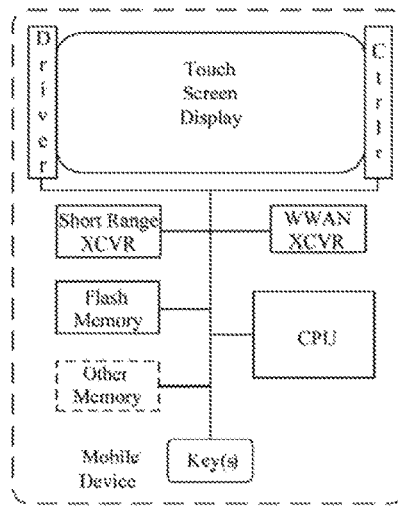
FIG. 9 is a simplified functional block diagram of a mobile device, as an alternate example of a user terminal device, for possible communication in or with the system of FIG. 1C.
Figure 7:
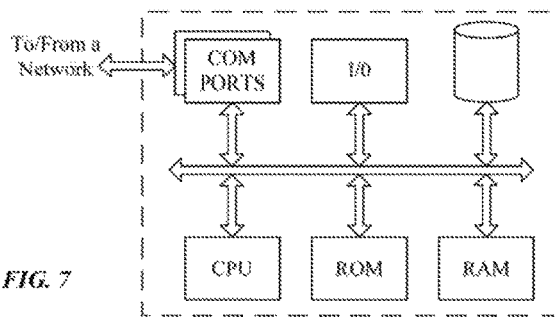
FIG. 7 is a simplified functional block diagram of a computer that may be configured as a host or server, for example, to function as the external server or a server if provided at the premises in the system of FIG. 1C.

As shown by the above discussion, although many intelligent processing functions of the system 10 are implemented in intelligent lighting system elements 11, 13, 15 or in the biomechantronic components 19, at least some functions of devices associated or in communication with the networked lighting system 10 as discussed relative to FIGS. 1C and 5-6 may be implemented with general purpose computers or other general purpose user terminal devices, although special purpose devices may be used. FIGS. 7-9 provide functional block diagram illustrations of exemplary general purpose hardware platforms.

FIG. 7 illustrates a network or host computer platform, as may typically be used to implement a host or server, such as the computer 63. FIG. 8 depicts a computer with user interface elements, as may be used to implement a personal computer or other type of work station or terminal device, such as one of the terminal 65 in FIG. 1, although the computer of FIG. 8 may also act as a server if appropriately programmed. The block diagram of a hardware platform of FIG. 9 represents an example of a mobile device, such as a tablet computer, smartphone or the like with a network interface to a wireless link, which may alternatively serve as a user terminal device like 65. It is believed that those skilled in the art are familiar with the structure, programming and general operation of such computer equipment and as a result the drawings should be self-explanatory.

A server platform (see e.g. FIG. 7), for example, includes a data communication interface for packet data communication via the particular type of available network, such as network 17 of FIG. 1C. The server platform also includes processor circuitry forming a central processing unit (CPU). The circuitry implementing the CPU may be based on any processor or microprocessor architecture such as Reduced Instruction Set Computing (RISC) using an ARM architecture, as commonly used today in mobile devices and other portable electronic devices, or a microprocessor architecture more commonly used in computers such as an Instruction Set Architecture (ISA) or Complex Instruction Set Computing (CISC) architecture. The CPU may use any other suitable architecture. Any such architecture may use one or more processing cores. The CPU may contain a single processor/microprocessor, or it may contain a number of microprocessors for configuring the server as a multi-processor system.

The server platform also includes a main memory that stores at least portions of instructions for execution by and data for processing by the CPU. The main memory may include one or more of several different types of storage devices, such as Read-Only Memory (ROM), Random Access Memory (RAM), cache and possibly an image memory (e.g. to enhance image/video processing). Although, not separately shown, the memory may include or be formed of other types of known memory/storage devices, such as Programmable Read-Only Memory (PROM), Erasable Programmable Read Only (EPROM), FLASH-EPROM, or the like.

The server platform typically also includes one or more mass storage devices. Although a storage device could be implemented using any of the known types of disk drive or tape drive, the trend is to utilize semiconductor memory technologies, particularly for portable or handheld system form factors. As noted, the main memory stores at least portions of instructions for execution and data for processing by the CPU. The mass storage device provides longer term non-volatile storage for larger volumes of program instructions and data.

The processor/CPU of the server platform typically is coupled to have access to the various instructions and data contained in the main memory and mass storage device. Although other interconnection arrangements may be used, the example utilizes an interconnect bus. The interconnect bus also provides internal communications with other elements of the server platform. The server platform also includes one or more input/output interfaces. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a desktop or laptop type personal computer (PC), similarly includes a data communication interface, CPU, main memory (such as a random access memory (RAM)) and one or more disc drives or other mass storage devices for storing user data and the various executable programs (see FIG. 8). A mobile device (see FIG. 9) type user terminal may include similar elements, but will typically use smaller components that also require less power, to facilitate implementation in a portable form factor. The example of FIG. 9 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 7 and the terminal computer platform of FIG. 8 are shown by way of example as using a RAM type main memory and a hard disk drive for mass storage of data and programming, whereas the mobile device of FIG. 9 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 8). The mobile device example in FIG. 9 uses a touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

Although FIGS. 7-9 in their present form show computers and user terminal devices, generally similar configurations also may be used within other elements of the lighting system 10 or within various types of biomechantronic components 19. For example, one implementation of the brain, communication and interface elements of a lighting device 11, of a standalone sensor 15, of a user interface device 13 or of any of the biomechantronic components 19 may utilize an architecture similar to that of one of the computers or mobile terminals. As a more specific example, the personal computer type hardware in FIG. 8 (except for the keyboard, mouse and display) could serve as the brain and communication elements of a lighting device, where the input/output interface I/O would interface to an appropriate light driver and to any sensor(s) or other enhancement input or output device(s) included within the lighting device. As another example of use of an architecture similar to those of FIGS. 7-9 that may be utilized in a system like that of FIG. 1C, a lighting controller or other user interface device (UI) might utilize an arrangement similar to the mobile device of FIG. 9, albeit possibly with only one transceiver compatible with the networking technology for the data network 17 of the particular premises 12 (e.g. to reduce costs).

As also outlined above, aspects of the techniques for providing wireless communication access for biomechantronic components 19 at the premises 12 and any system interaction therewith, may involve some programming, e.g. programming of the appropriate system dements 11, 13 or 15, biomechantronic components 19 and/or computers, terminals or the like in communication therewith. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer of the lighting system service provider into any of the lighting devices, sensors, user interface devices, other non-lighting-system devices, etc. of or coupled to the system 10 at the premises 12, including both programming for individual element functions and programming for distributed processing functions. Thus, another type of media that may bear the software/firmware program elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible, or "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A biomechatronic component for operation within or attached to a biomechatronically enhanced organism, comprising:
   a communication interface comprising a wireless transceiver and configured to enable data communications via a wireless data communication link with a lighting device;
   a processor coupled to communicate via the communication interface and configured to control communications via the communication interface; and
   a memory accessible by the process,
   wherein the processor is further configured to:
      control a signal exchange between the biomechatronic component and the biomechantronically enhanced organism to produce information related to operation of the biomechantronic component or the biomechantronically enhanced organism;
      store the produced information related to operation of the biomechatronic component or the biomechatronically enhanced organism in the memory; and
      further control communication via the communication interface to deliver, to the lighting device, the produced information related to operation of the biomechatronic component or the biomechantronically enhanced organism and information.

2. The biomechatronic component of claim 1, wherein the wireless transceiver implements visible light communication.

3. The biomechatronic component of claim 1, wherein the processor is further configured to control communications via the communication interface, the controlled communications enabling:
   identification of a location of the biomechatronically enhanced organism; and
   services related to the identified location.

4. A biomechatronic component for operation within or attached to a biomechatronically enhanced organism, comprising:

a communication interface comprising a wireless transceiver and configured to enable data communications via a wireless data communication link with a lighting device;

a processor coupled to communicate via the communication interface and configured to control communications via the communication interface;

a memory accessible by the processor;

a biological interface coupled to the processor and configured to enable a signal exchange between the biomechatronic component and the biomechatronically enhanced organism; and a sensor coupled to the processor and configured to sense a condition related to operation of the biomechatronic component, wherein the processor is further configured to:

control the signal exchange between the biomechatronic component and the biomechatronically enhanced organism to produce information related to operation of the biomechatronic component or the biomechatronically enhanced organism;

store the produced information related to operation of the biomechatronic component or the biomechatronically enhanced organism in the memory; and further control communications via the communication interface to deliver, to the lighting device, the produced information related to operation of the biomechatronic component or the biomechatronically enhanced organism and information related to the sensed condition.

5. The biomechatronic component of claim 1, further comprising:

executable client programming stored in the memory, wherein execution of the client programming by the processor configures the biomechatronic component to:

communicate with a server executing on a processor of the lighting device; and submit a client request to the server, the client request comprising a processing job to be performed via the server.

6. A biomechatronic component for operation within or attached to a biomechatronically enhanced organism, comprising:

an energy store;

a charger coupled to the energy store and configured to utilize radiant energy provided via artificial manipulation by a lighting device to charge the energy store;

a communication interface comprising a wireless transceiver and configured to enable data communications via a wireless data communication link with the light device;

a processor coupled to communicate via the communication interface and configured to control communications via the communication interface;

a memory accessible by the processor;

a biological interface coupled to the processor and configured to enable a signal exchange between the biomechatronic component and the biomechantronically enhanced organism; and a sensor coupled to the processor and configured to sense a condition related to operation of the biomechatronic component, wherein the processor is configured to:

control the signal exchange between the biomechatronic component and the biomechatronically enhanced organism to produce information related to operation of the biomechatronic component or the biomechatronically enhanced organism;

store the produced information related to operation of the biomechatronic component or the biomechatronically enhanced organism in the memory; and further control communication via the communication interface to deliver, to the lighting device, the produced information related to operation of the biomechatronic component or the biomechantronically enhanced organism and information related to the sensed condition.

7. The biomechatronic component of claim 6, wherein the charger is a photovoltaic charger responsive to light produced via artificial manipulation by the lighting device to provide electrical power to charge the energy store.

8. The biomechatronic component of claim 6, wherein the charger is a microwave charger responsive to a microwave produced via artificial manipulation by the lighting device to provide electrical power to charge the energy store.

9. The biomechatronic component of claim 6, wherein the charger is an ultrasonic charger responsive to an ultrasound produced via artificial manipulation by the lighting device to provide electrical power to charge the energy store.

* * * * *